US012357537B2

(12) United States Patent
Abal et al.

(10) Patent No.: US 12,357,537 B2
(45) Date of Patent: Jul. 15, 2025

(54) LOCKING CAP ASSEMBLY

(71) Applicant: CareFusion 303, Inc., San Diego, CA (US)

(72) Inventors: Daniel M. Abal, San Diego, CA (US); Brendan John Burgess, Poway, CA (US); Ramkumar Subramanian, San Diego, CA (US)

(73) Assignee: CareFusion 303, Inc., San Diego, CA (US)

( * ) Notice: Subject to any disclaimer, the term of this patent is extended or adjusted under 35 U.S.C. 154(b) by 120 days.

(21) Appl. No.: 18/550,581

(22) PCT Filed: Mar. 17, 2022

(86) PCT No.: PCT/US2022/020812
§ 371 (c)(1),
(2) Date: Sep. 14, 2023

(87) PCT Pub. No.: WO2022/197966
PCT Pub. Date: Sep. 22, 2022

(65) Prior Publication Data

US 2024/0189185 A1 Jun. 13, 2024

Related U.S. Application Data

(60) Provisional application No. 63/162,482, filed on Mar. 17, 2021.

(51) Int. Cl.
*A61J 1/14* (2023.01)
*G07C 9/00* (2020.01)

(52) U.S. Cl.
CPC ........... *A61J 1/1437* (2013.01); *A61J 1/1412* (2013.01); *G07C 9/00309* (2013.01); *G07C 9/00896* (2013.01); *A61J 2205/60* (2013.01)

(58) Field of Classification Search
CPC .. G07C 9/00; G07C 9/00309; G07C 9/00896; G07C 9/00904; G07C 9/00912;
(Continued)

(56) References Cited

U.S. PATENT DOCUMENTS 5,852,590 A * 12/1998 de la Huerga ... G06K 19/07762 368/10
10,180,018 B1 * 1/2019 Simpson ............... A61J 7/0481
(Continued)

OTHER PUBLICATIONS

International Search Report and Written Opinion for Application No. PCT/US2022/020812, dated Jul. 7, 2022, 12 pages.

*Primary Examiner* — Nathan Cumar

(57) ABSTRACT

A locking cap assembly includes an upper housing; a lower housing rotatably connected to the upper housing and configured to be fitted onto a container; a near field communication (NFC) module configured to wirelessly receive a NFC input; an inductive charging coil; a microprocessor; and a latching mechanism, the latching mechanism includes a locking latch configured to prevent the upper housing and the lower housing from rotating with respect to each other; and an electrical actuation component configured to lock and unlock the latch and a current generated by the inductive charging coil. The lower housing includes a plurality of locking vanes within the lower housing, the locking vanes being configured to variably define an inner diameter size of the lower housing responsive to a rotation of the upper housing with respect to the lower housing when the lower housing is mechanically engaged with the container.

20 Claims, 15 Drawing Sheets

(58) Field of Classification Search
CPC .. G07C 2009/0092; G07C 2009/00928; G07C 2009/00936; A61J 1/03; A61J 1/1412; A61J 1/1418; A61J 1/1437; A61J 2205/00; A61J 2205/60
USPC .............................................................. 70/63
See application file for complete search history.

(56) References Cited

U.S. PATENT DOCUMENTS

| | | | | |
|---|---|---|---|---|
| 10,358,272 | B2 * | 7/2019 | Brotzel | A61J 7/0481 |
| 10,729,860 | B1 * | 8/2020 | Boyer | A61M 15/0066 |
| 10,751,259 | B1 * | 8/2020 | Dutta | A61J 7/0472 |
| 10,874,590 | B1 * | 12/2020 | Butaud | A61J 7/0046 |
| 2017/0281467 | A1 * | 10/2017 | Solotoff | A61J 1/1437 |
| 2018/0126273 | A1 * | 5/2018 | Lee | A63F 13/92 |
| 2019/0063128 | A1 * | 2/2019 | McLeod | E05B 47/0002 |
| 2020/0085686 | A1 * | 3/2020 | Aliakbarian | A61J 7/0445 |
| 2020/0113787 | A1 * | 4/2020 | Sirdeshmukh | A61J 7/0418 |
| 2020/0130900 | A1 * | 4/2020 | Herbert | A61J 1/1412 |
| 2020/0130908 | A1 * | 4/2020 | Ponticelli, Sr. | G07C 9/00944 |
| 2020/0234822 | A1 * | 7/2020 | Minocha | A61J 7/0445 |
| 2020/0368113 | A1 * | 11/2020 | Chen | A61J 7/0436 |
| 2020/0390651 | A1 * | 12/2020 | Busman | A61J 1/03 |
| 2020/0390655 | A1 * | 12/2020 | Patel | B65D 21/0228 |
| 2020/0390656 | A1 * | 12/2020 | Aertker | B65D 50/00 |

* cited by examiner

LOCKING CAP ASSEMBLY

CROSS REFERENCE TO RELATED APPLICATIONS

This is a National Stage application, filed under 35 U.S.C. § 371, of International Patent Application No. PCT/US2022/020812, filed Mar. 17, 2022, entitled "Locking Cap Assembly", which claims priority to U.S. Provisional Application No. 63/162,482, filed Mar. 17, 2021, entitled "Locking Cap Assembly," the disclosures of each are incorporated herein by reference in their entireties.

TECHNICAL FIELD

This application relates generally to a locking cap assembly.

BACKGROUND

Unauthorized access to medical containers or administering a medication prior to a scheduled time period for a subsequent dose may harm patient safety.

SUMMARY

Patient safety can be enhanced by ensuring that authorized access to containers storing medication is granted only to authorized persons and at an authorized time. Some patients may not be able to adhere to a prescribed schedule for self-administering a medication. As a result, accidentally administering a subsequent dose of a medication before the intended time of that dose may harm patient safety. Sometimes, patients may not be able to recall when the last dose was administered, and thus cause uncertainty in when the next dose should be administered.

Accordingly, there is a need for systems, devices, and methods that assist a patient in adhering to a prescribed schedule for administering a medication. By granting the patient and or caregivers authorized access to the medication only at an authorized time (e.g., the time of a subsequent dose) and automatically logging a time when the medication was accessed from the container, patient safety may be improved.

The systems, devices, and methods described herein provide an automated way to lock a medicine container and unlocking the medicine container only when a valid authorization code is provided to a locking cap assembly securing the medicine. According to various implementations, the medicine container is permitted to be unlocked only within a time window when a subsequent dose of the medicine is to be administered. The authorization code may be transferred between caregivers and/or the patient to allow additional or different authorized personnel access to the medicine container.

The disclosed devices and systems include a locking cap assembly having an upper housing, a lower housing rotatably connected to the upper housing and configured to be fitted onto a container, a near field communication (NFC) module configured to wirelessly receive a NFC input, an inductive charging coil, a microprocessor; and a latching mechanism. The latching mechanism includes: a locking latch configured to prevent the upper housing and the lower housing from rotating with respect to each other; and an electrical actuation component configured to lock and unlock the latch responsive to a signal received from the microprocessor and a current generated by the inductive charging coil. The lower housing includes a plurality of locking vanes within the lower housing, the locking vanes being configured to variably define an inner diameter size of the lower housing responsive to a rotation of the upper housing with respect to the lower housing when the lower housing is mechanically engaged with the container. When the locking cap assembly is configured to lock onto the container by contracting the plurality of vanes about the container responsive to a rotation of the upper housing with respect to the lower housing in a first direction. The microprocessor is configured to receive the NFC input from the NFC module and to unlock the locking latch and permit the rotation of upper housing with respect to the lower housing in a second direction to retract the plurality of locking vanes and release the lower housing from the container responsive to the microprocessor determining that the NFC input received by the NFC module corresponds to an authorization to release the locking cap assembly from the container.

The disclosed subject matter also relates to a method of securing a medication container, the method includes receiving, by a near field communication (NFC) module in a locking cap assembly, an authorization code sent wirelessly from a device placed in proximity to the locking cap assembly via a communication channel of the NFC module. In accordance with a determination that the authorization code is a valid authorization code, determining if a current time is within a medication administration time interval. In accordance with a determination that the current time is within the medication administration time interval: releasing a locking latch of the locking cap assembly to permit a plurality of locking vanes of the locking cap assembly to retract when an input received by the NFC module corresponds to an authorization to release the locking cap assembly from the container. The plurality of locking vanes variably defines a size of a central opening, and the central opening defined by the plurality of locking vanes is configured to be mechanically engaged with the medication container in a locked state of the locking cap assembly. Electrical power for releasing the locking latch is provided by a wireless energy transfer from the device via the communication channel to a motor of the locking cap assembly.

Other aspects include corresponding apparatus, and computer program products for implementation of the corresponding system and its features.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

For a better understanding of the various described implementations, reference should be made to the Description below, in conjunction with the following drawings. Like reference numerals refer to corresponding parts throughout the figures and description.

DESCRIPTION

Reference will now be made to implementations, examples of which are illustrated in the accompanying drawings. In the following description, numerous specific details are set forth in order to provide an understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Figure 1:
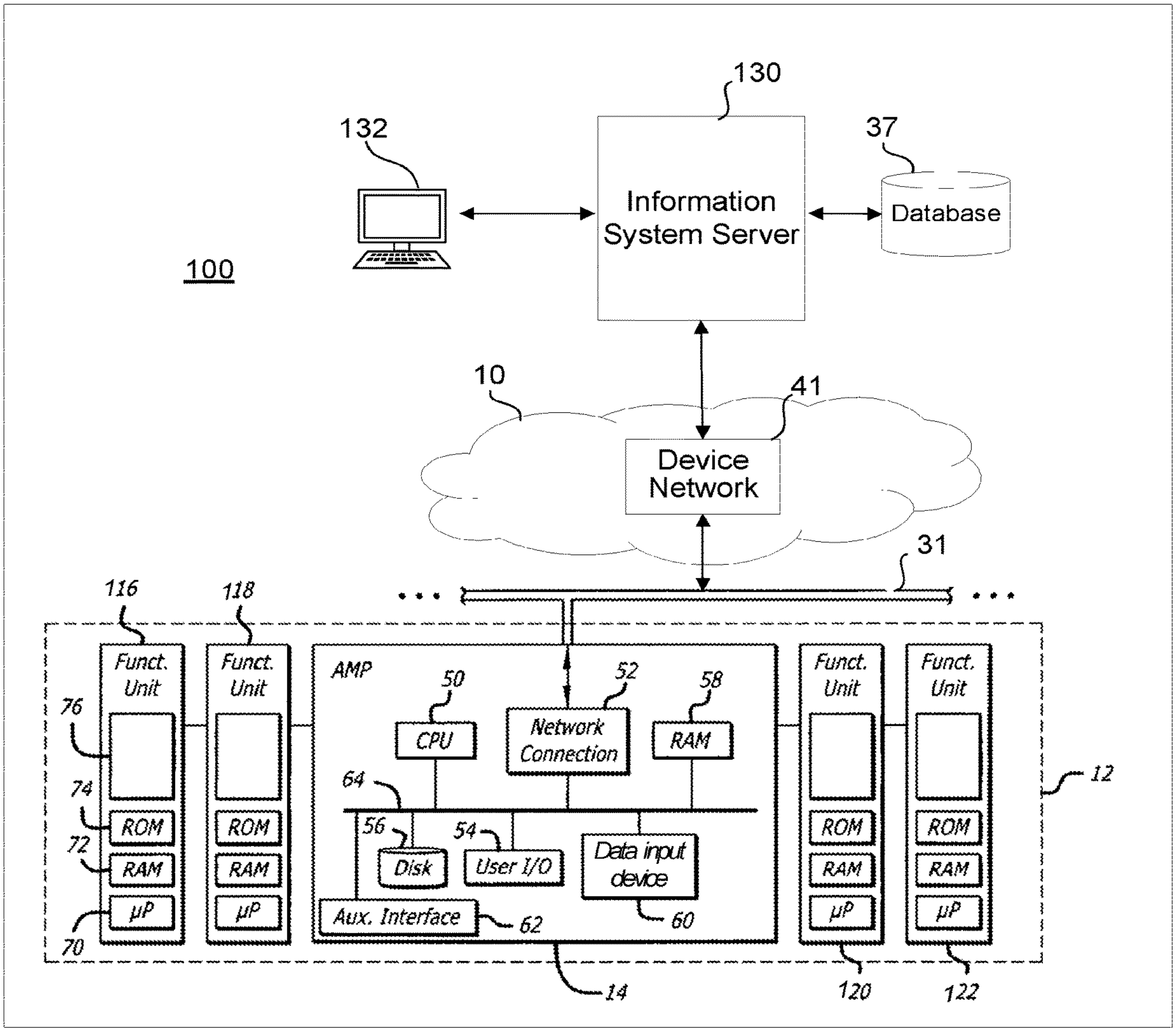
FIG. 1 depicts an example of an institutional patient care system of a healthcare organization, according to aspects of the subject technology.

FIG. 1 depicts an example of an institutional patient care system 100 of a healthcare organization, according to aspects of the subject technology. In FIG. 1, a patient care device (or "medical device" generally) 12 is connected to a hospital network 10. The term patient care device (or "PCD") may be used interchangeably with the term patient care unit (or "PCU"), either which may include various ancillary medical devices such as an infusion pump, a vital signs monitor, a medication dispensing device (e.g., cabinet, tote), a medication preparation device, an automated dispensing device, a module coupled with one of the aforementioned (e.g., a syringe pump module configured to attach to an infusion pump), or other similar devices. Each patient care device 12 is connected to an internal healthcare network 10 by a transmission channel 31. Transmission channel 31 is any wired or wireless transmission channel, for example an 802.11 wireless local area network (LAN). In some implementations, network 10 also includes computer systems located in various departments throughout a hospital. For example, network 10 of FIG. 1 optionally includes computer systems associated with an admissions department, a billing department, a biomedical engineering department, a clinical laboratory, a central supply department, one or more unit station computers and/or a medical decision support system. As described further below, network 10 may include discrete subnetworks. In the depicted example, network 10 includes a device network 41 by which patient care devices 12 (and other devices) communicate in accordance with normal operations.

Additionally, institutional patient care system 100 may incorporate a separate information system server 130, the function of which will be described in more detail below. Moreover, although the information system server 130 is shown as a separate server, the functions and programming of the information system server 130 may be incorporated into another computer, if such is desired by engineers designing the institution's information system. Institutional patient care system 100 may further include one or multiple device terminals 132 for connecting and communicating with information system server 130. Device terminals 132 may include personal computers, personal data assistances, mobile devices such as laptops, tablet computers, augmented reality devices, or smartphones, configured with software for communications with information system server 130 via network 10.

Patient care device 12 comprises a system for providing patient care, such as that described in Eggers et al., which is incorporated herein by reference for that purpose. Patient care device 12 may include or incorporate pumps, physiological monitors (e.g., heart rate, blood pressure, ECG, EEG, pulse oximeter, and other patient monitors), therapy devices, and other drug delivery devices may be utilized according to the teachings set forth herein. In the depicted example, patient care device 12 comprises a control module 14, also referred to as interface unit 14, connected to one or more functional modules 116, 118, 120, 122. Interface unit 14 includes a central processing unit (CPU) 50 connected to a memory, for example, random access memory (RAM) 58, and one or more interface devices such as user interface device 54, a coded data input device 60, a network connection 52, and an auxiliary interface 62 for communicating with additional modules or devices. Interface unit 14 also, although not necessarily, includes a main non-volatile storage unit 56, such as a hard disk drive or non-volatile flash memory, for storing software and data and one or more internal buses 64 for interconnecting the aforementioned elements.

In various implementations, user interface device 54 is a touch screen for displaying information to a user and allowing a user to input information by touching defined areas of the screen. Additionally or in the alternative, user interface device 54 could include any means for displaying and inputting information, such as a monitor, a printer, a keyboard, softkeys, a mouse, a track ball and/or a light pen. Data input device 60 may be a bar code reader capable of scanning and interpreting data printed in bar coded format. Additionally or in the alternative, data input device 60 can be any device for entering coded data into a computer, such as a device(s) for reading a magnetic strips, radio-frequency identification (RFID) devices whereby digital data encoded in RFID tags or smart labels (defined below) are captured by the reader 60 via radio waves, PCMCIA smart cards, radio frequency cards, memory sticks, CDs, DVDs, or any other analog or digital storage media. Other examples of data input device 60 include a voice activation or recognition device or a portable personal data assistant (PDA). Depending upon the types of interface devices used, user interface device 54 and data input device 60 may be the same device. Although data input device 60 is shown in FIG. 1 to be disposed within interface unit 14, it is recognized that data input device 60 may be integral within pharmacy system 34 or located externally and communicating with pharmacy system 34 through an RS-232 serial interface or any other appropriate communication means. Auxiliary interface 62 may be an RS-232 communications interface, however any other means for communicating with a peripheral device such as a printer, patient monitor, infusion pump or other medical device may be used without departing from the subject technology. Additionally, data input device 60 may be a separate functional module, such as modules 116, 118, 120 and 122, and configured to communicate with controller 14, or any other system on the network, using suitable programming and communication protocols.

Network connection 52 may be a wired or wireless connection, such as by Ethernet, WiFi, BLUETOOTH, an integrated services digital network (ISDN) connection, a digital subscriber line (DSL) modem or a cable modem. Any direct or indirect network connection may be used, including, but not limited to a telephone modem, an MIB system, an RS232 interface, an auxiliary interface, an optical link, an infrared link, a radio frequency link, a microwave link or a WLANS connection or other wireless connection.

Functional modules 116, 118, 120, 122 are any devices for providing care to a patient or for monitoring patient condition. As shown in FIG. 1, at least one of functional modules 116, 118, 120, 122 may be an infusion pump module such as an intravenous infusion pump for delivering medication or other fluid to a patient. For the purposes of this discussion, functional module 116 is an infusion pump module. Each of functional modules 118, 120, 122 may be any patient treatment or monitoring device including, but not limited to, an infusion pump, a syringe pump, a PCA pump, an epidural pump, an enteral pump, a blood pressure monitor, a pulse oximeter, an EKG monitor, an EEG monitor, a heart rate monitor or an intracranial pressure monitor or the like. Functional module 118, 120 and/or 122 may be a printer, scanner, bar code reader or any other peripheral input, output or input/output device.

Each functional module 116, 118, 120, 122 communicates directly or indirectly with interface unit 14, with interface unit 14 providing overall monitoring and control of device 12. Functional modules 116, 118, 120, 122 may be connected physically and electronically in serial fashion to one or both ends of interface unit 14 as shown in FIG. 1, or as detailed in Eggers et al. However, it is recognized that there are other means for connecting functional modules with the interface unit that may be utilized without departing from the subject technology. It will also be appreciated that devices such as pumps or patient monitoring devices that provide sufficient programmability and connectivity may be capable of operating as stand-alone devices and may communicate directly with the network without connected through a separate interface unit or control unit 14. As described above, additional medical devices or peripheral devices may be connected to patient care device 12 through one or more auxiliary interfaces 62.

Each functional al module 116, 118, 120, 122 may include module-specific components 76, a microprocessor 70, a volatile memory 72 and a nonvolatile memory 74 for storing information. It should be noted that while four functional modules are shown in FIG. 1, any number of devices may be connected directly or indirectly to controller unit 14. The number and type of functional modules described herein are intended to be illustrative, and in no way limit the scope of the subject technology. Module-specific components 76 include any components necessary for operation of a particular module, such as a pumping mechanism for infusion pump module 116.

While each functional module may be capable of a least some level of independent operation, interface unit 14 monitors and controls overall operation of device 12. For example, as will be described in more detail below, interface unit 14 provides programming instructions to the functional modules 116, 118, 120, 122 and monitors the status of each module. The programming instructions may be based a volume or flow rate detected using at least some of the features described.

Patient care device 12 is capable of operating in several different modes, or personalities, with each personality defined by a configuration database. The configuration database may be a database 56 internal to patient care device, or an external database 37. A particular configuration database is selected based, at least in part, by patient-specific information such as patient location, age, physical characteristics, or medical characteristics. Medical characteristics include, but are not limited to, patient diagnosis, treatment prescription, medical history, medical records, patient care provider identification, physiological characteristics or psychological characteristics. As used herein, patient-specific information also includes care provider information (e.g., physician identification) or a patient care device's location in the hospital or hospital computer network. Patient care information may be entered through interface device 52, 54, 60 or 62, and may originate from anywhere in network 10, such as, for example, from a pharmacy server, admissions server, laboratory server, and the like.

Medical devices incorporating aspects of the subject technology may be equipped with a Network Interface Module (NIM), allowing the medical device to participate as a node in a network. While for purposes of clarity the subject technology will be described as operating in an Ethernet network environment using the Internet Protocol (IP), it is understood that concepts of the subject technology are equally applicable in other network environments, and such environments are intended to be within the scope of the subject technology.

Data to and from the various data sources can be converted into network-compatible data with existing technology, and movement of the information between the medical device and network can be accomplished by a variety of means. For example, patient care device 12 and network 10 may communicate via automated interaction, manual interaction or a combination of both automated and manual interaction. Automated interaction may be continuous or intermittent and may occur through direct network connection 54 (as shown in FIG. 1), or through RS232 links, MIB systems, RF links such as BLUETOOTH, IR links, WLANS, digital cable systems, telephone modems or other wired or wireless communication means. Manual interaction between patient care device 12 and network 10 involves physically transferring, intermittently or periodically, data between systems using, for example, user interface device 54, coded data input device 60, bar codes, computer disks, portable data assistants, memory cards, or any other media for storing data. The communication means in various aspects is bidirectional with access to data from as many points of the distributed data sources as possible. Decision-making can occur at a variety of places within network 10. For example, and not by way of limitation, decisions can be made in health information server (HIS) 30, decision support 48, remote data server 49, hospital department or unit stations 46, or within patient care device 12 itself.

Direct communications with medical devices operating on a network in accordance with the subject technology may be performed through information system server 30, also known as the remote data server (RDS). In accordance with aspects of the subject technology, network interface modules incorporated into medical devices such as, for example, infusion pumps or vital signs measurement devices, ignore all network traffic that does not originate from an authenticated RDS. The primary responsibilities of the RDS of the subject technology are to track the location and status of all networked medical devices that have NIMs, and maintain open communication.

Figure 2A:
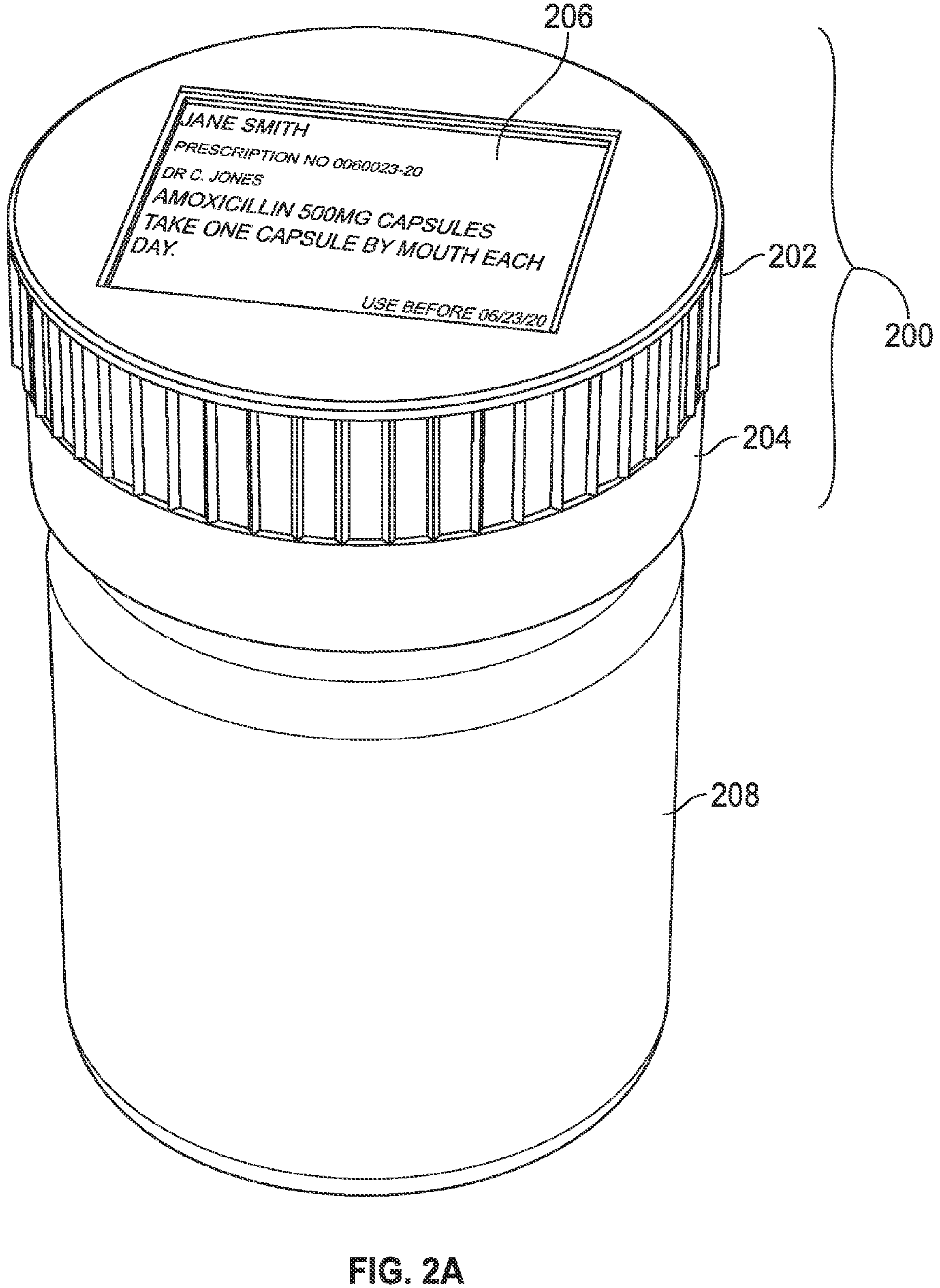
FIG. 2A depicts an example of a locking cap assembly secured to a medicine container, according to aspects of the subject technology.

FIG. 2A depicts an example of a locking cap assembly secured to a medicine container, according to aspects of the subject technology. FIG. 2A shows a locking cap assembly 200 securing a medicine bottle 208. The locking cap assembly 200 includes an upper housing 202, a lower housing 204, and a display 206 positioned on the upper housing 202. The lower housing 204 is rotatably connected to the upper housing and configured to be fitted onto the medicine bottle 208. The lower housing 204 is positioned between the upper housing 202 and the medicine bottle 208. Positioned within the upper housing 202 are electronic and communication components described in greater details in FIG. 3A and FIG. 4A.

According to various implementations, the locking cap assembly 200 may display and/or store a unique identifier that is associated to a patient, and medication contained in the medicine bottle 208. The unique identifier may be wirelessly communicated to the locking cap assembly 200 and may be stored internally by the locking cap assembly 200. The locking cap assembly 200 includes a communication module that allows other devices to read its unique identifier. The communication module may include a near field communication (NFC) module that is configured to wirelessly receive a NFC input. In some implementations, the unique identifier may be read by a NFC module of another device (e.g., a phone, a tablet). In some implementations, the locking cap assembly 200 is configured to transmit the unique identifier to a device proximate to the locking cap assembly 200, and receive the authorization, via the NFC module, from the device proximate to the locking cap assembly after the unique identifier is transmitted to and read by the device.

In some implementations, the display 206 on the locking cap assembly 200 may display an optically scannable indicia (e.g., a 2D barcode) that can be scanned by a device (e.g., a phone, a tablet, a handheld optical scanner). When the device is placed in proximity to (e.g., within two inches, or in contact with) the locking cap assembly 200, the NFC reader in the device may read the unique identifier of the locking cap assembly 200. The device may then provide, to the locking cap assembly 200, an authorization code specific to the locking cap assembly 200 in order to enable unlocking of the locking cap assembly 200. In some implementations, the valid authorization code is transmitted as a cryptographic hash code from the device to the locking cap assembly, and the locking cap assembly is able to store a decryption key that allows a microprocessor on the locking cap assembly to decrypt the valid authorization code.

In some implementations, the authorization code is provided to an authorized device via an application installed on the device. For example, the authorization code is sent from a cloud server to the application installed on the device. The cloud server may use other methods to authenticate the identity of the user of the device, to confirm that the user granted access to the medication in the medicine bottle 208 is an authorized user. The scannable indicia displayed on the display 206 may allow the device to identify the medication stored in the medicine bottle, even for users who may not having access to the application that relays the authorization code from the cloud server. Such users, by scanning the scannable indicia, may be directed to a manufacturer of the drug to receiver further information such as side effects, recommended administration, or precautions associated with the medication. The user may also be provided with contact information to a doctor or caregiver in case of an emergency.

The locking cap assembly 200 may be used to lock single bottles of medications, and may be used also in situations where multiple bottles may need to be controlled and monitored, such as in a hospital, a school, an institution, or a doctor's office.

Figure 2B:
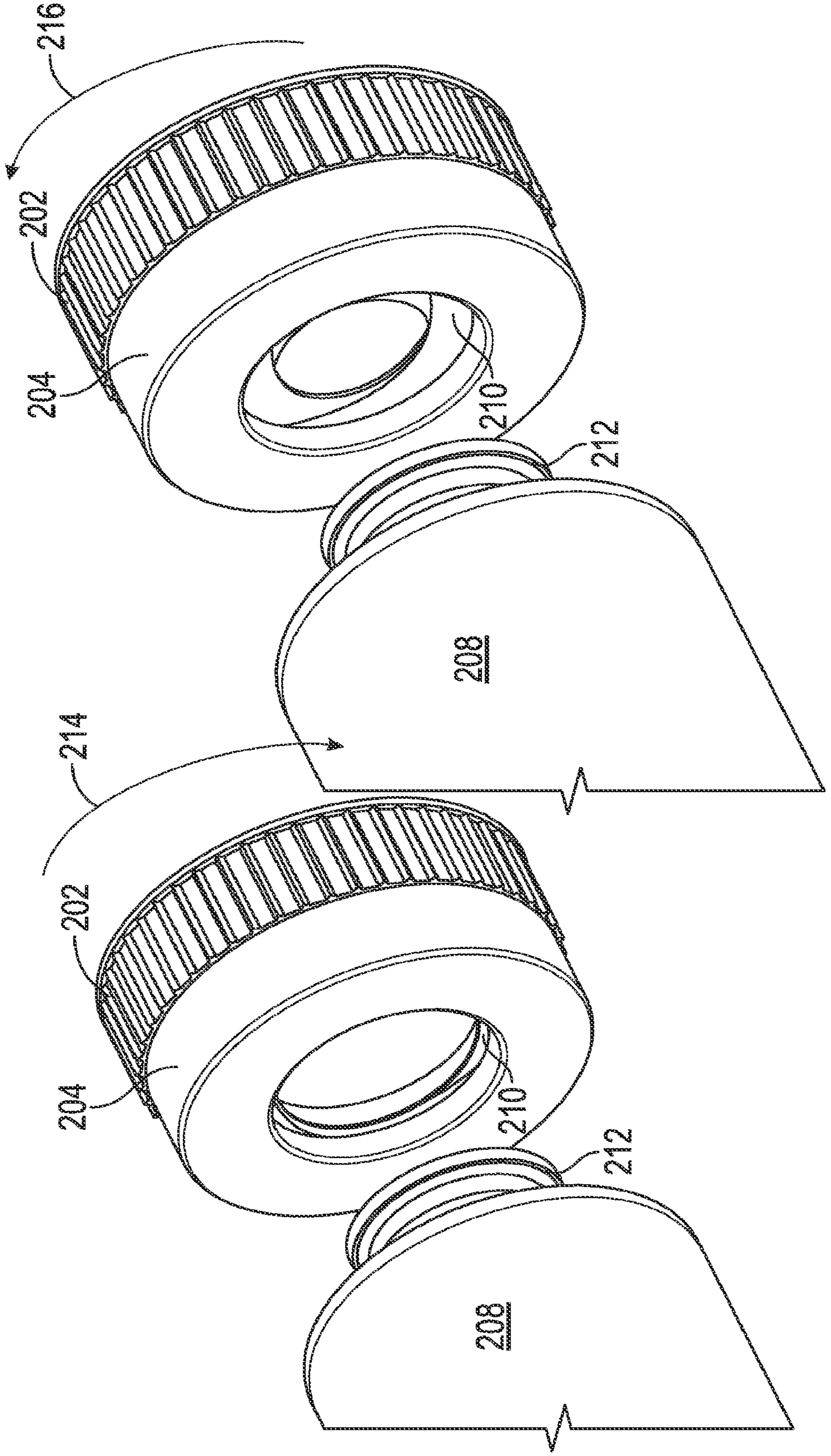
FIG. 2B depicts an example of a locking cap assembly having locking vanes in two different configurations, according to aspects of the subject technology.

FIG. 2B depicts an example of a locking cap assembly having locking vanes in two different configurations, according to aspects of the subject technology. FIG. 2B shows locking vanes 210 in two different positions by rotating the upper housing 202 relative to the lower housing 204. The locking cap assembly 200 is placed over a mouth or opening of the medicine bottle 208. By rotating the upper housing 202 in a clockwise fashion as shown by an arrow 214, the locking vanes 210 (originally in a retracted position and do not engage a corresponding protruding lip 212, or locking rim, of the medicine bottle 208) may start to extend and engage with the lip 212. By rotating the upper housing 202 in a counterclockwise fashion as shown by an arrow 216, the locking vanes 210 (originally in an extended position and engaged with the corresponding protruding lip 212 of the medicine bottle 208) may start to retract, allowing the locking cap assembly 200 to be removed from the medicine bottle 208. The locking vanes 210 are configured to variably define an inner diameter size of the lower housing 204 responsive to a rotation of the upper housing 202 with respect to the lower housing 204 when the lower housing 204 is mechanically engaged with the medicine bottle 208. For example, the locking cap assembly 200 is configured to lock onto the medicine bottle 208 by contracting the locking vanes 210 about the medicine bottle 208 responsive to a rotation of the upper housing 202 with respect to the lower housing 204 in a first direction (e.g., a counter-clockwise direction).

The adjustable locking vanes 210 allow the locking cap assembly 200 to adapt to various bottle sizes that have mouths of different diameters. Such a feature allows the locking cap assembly 200 to accommodate multiple different bottle sizes. The locking cap assembly 200 is removed from the medicine bottle 208 by twisting the upper housing 202 relative to the lower housing 204 until the locking vanes 210 are in the retracted position and no longer engage the protruding lip 212 of the medicine bottle 208.

Figure 2C:
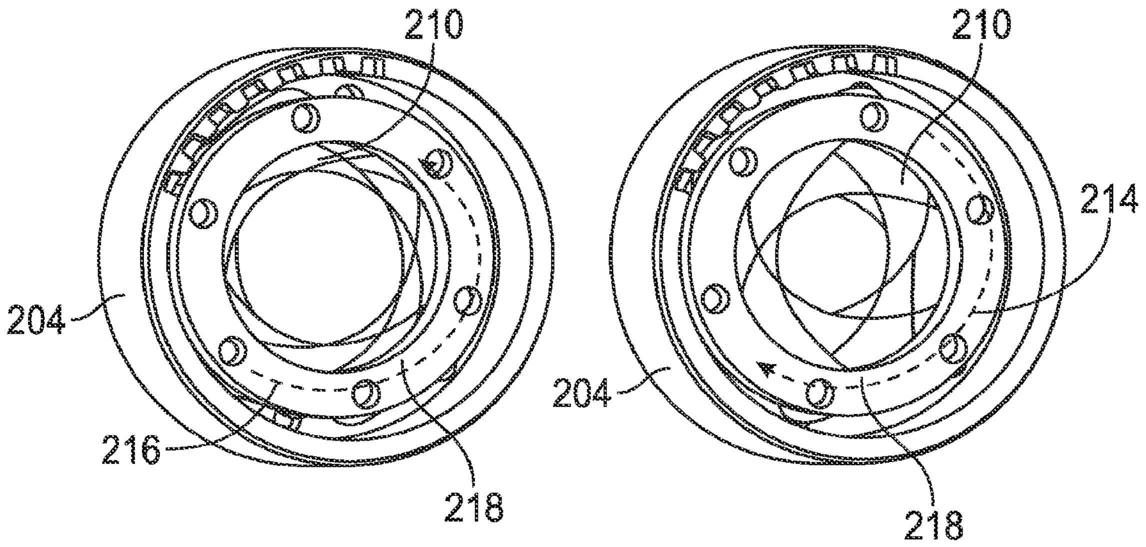
FIG. 2C depicts locking vanes in two different configurations, according to aspects of the subject technology.

FIG. 2C depicts locking vanes in two different configurations, according to aspects of the subject technology. FIG. 2C shows a view of the locking vanes 210 positioned within the lower housing 204 when the upper housing 202 is removed from the lower housing. The left portion of FIG. 2C shows the locking vane 210 in the retracted position. The right portion of FIG. 2C shows the locking vanes 210 in the extended position. A counterclockwise rotation of a vane positioning ring 218 retracts the locking vanes 210. The vane positioning ring 218 is within the lower housing 204 and is coupled to the locking vanes 210 and to the upper housing 202. The vane positing ring 218 extends or retracts the locking vanes 210 when the vane positioning ring 218 is rotated, together with the upper housing 202, relative to the lower housing 204. A clockwise rotation of a vane positioning ring 218 extends the locking vanes 210. The vane positioning ring 218 is connected to the upper housing 202 and is rotated when the upper housing 202 is twisted. Twisting the upper housing 202 in a clockwise direction closes the locking vanes 210, and twisting the upper housing 202 in a counterclockwise direction opens the locking vanes 210.

Figure 2D:
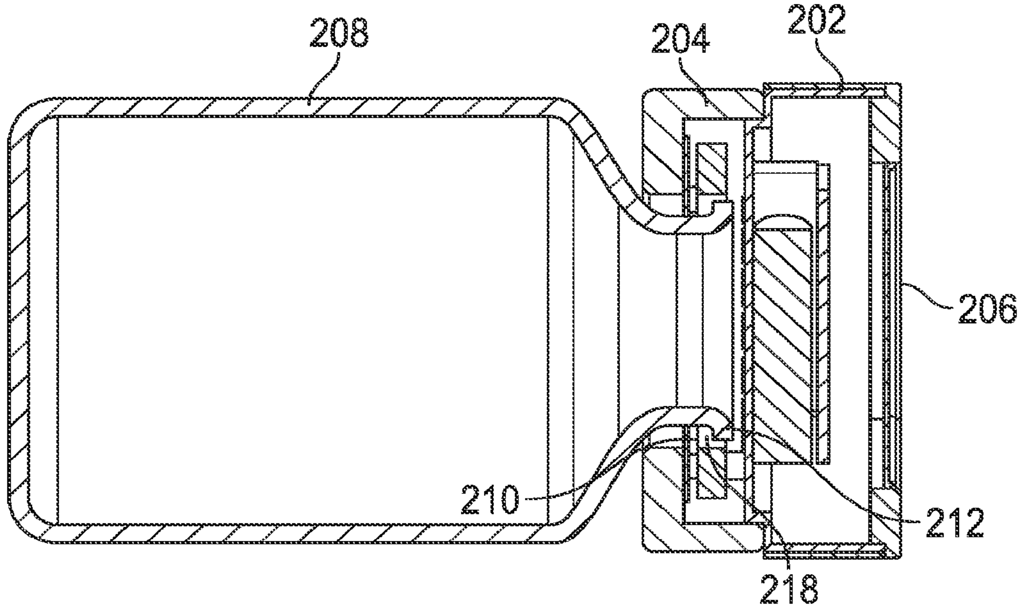
FIG. 2D depicts a cross sectional view of the locking cap assembly and medicine bottle shown in FIG. 2A, according to aspects of the subject technology.

FIG. 2D depicts a cross sectional view of the locking cap assembly and medicine bottle shown in FIG. 2A, according to aspects of the subject technology. FIG. 2D shows a cross-sectional view of the locking cap assembly 200 and the medicine bottle 208. The upper housing 202 is entirely above the medicine bottle 208 (shown as being entirely to the right of the medicine bottle 208 in FIG. 2D). The lower housing 204 surrounds a neck or mouth region of the medicine bottle 208. The vane positing ring is further away from the medicine bottle 208 (extended further to the right of FIG. 2D) compared to the locking vanes 210. When the locking vanes 210 are in the extended position, they engage the protruding lip 212 in the neck region of the medicine bottle 208 to prevent the removal of the locking cap assembly 200 from the medicine bottle 208. When the locking vanes 210 are in the retracted position, they no longer engage the protruding lip 212 of the medicine bottle 208 and the locking cap assembly 200 may be removed from the medicine bottle 208. Some medicine containers include a lip at an opening of the container for engaging with a corresponding snap bottle cap. The locking vanes 210 may lock onto the lip of such a medicine containers. Some medicine container includes threads for engaging with a corresponding screw-type cap. The locking vanes 210 may also lock onto threads of such medicine containers. In other words, the locking cap assembly 200 is adapted to function together with a variety of existing medicine bottles.

Figure 3A:
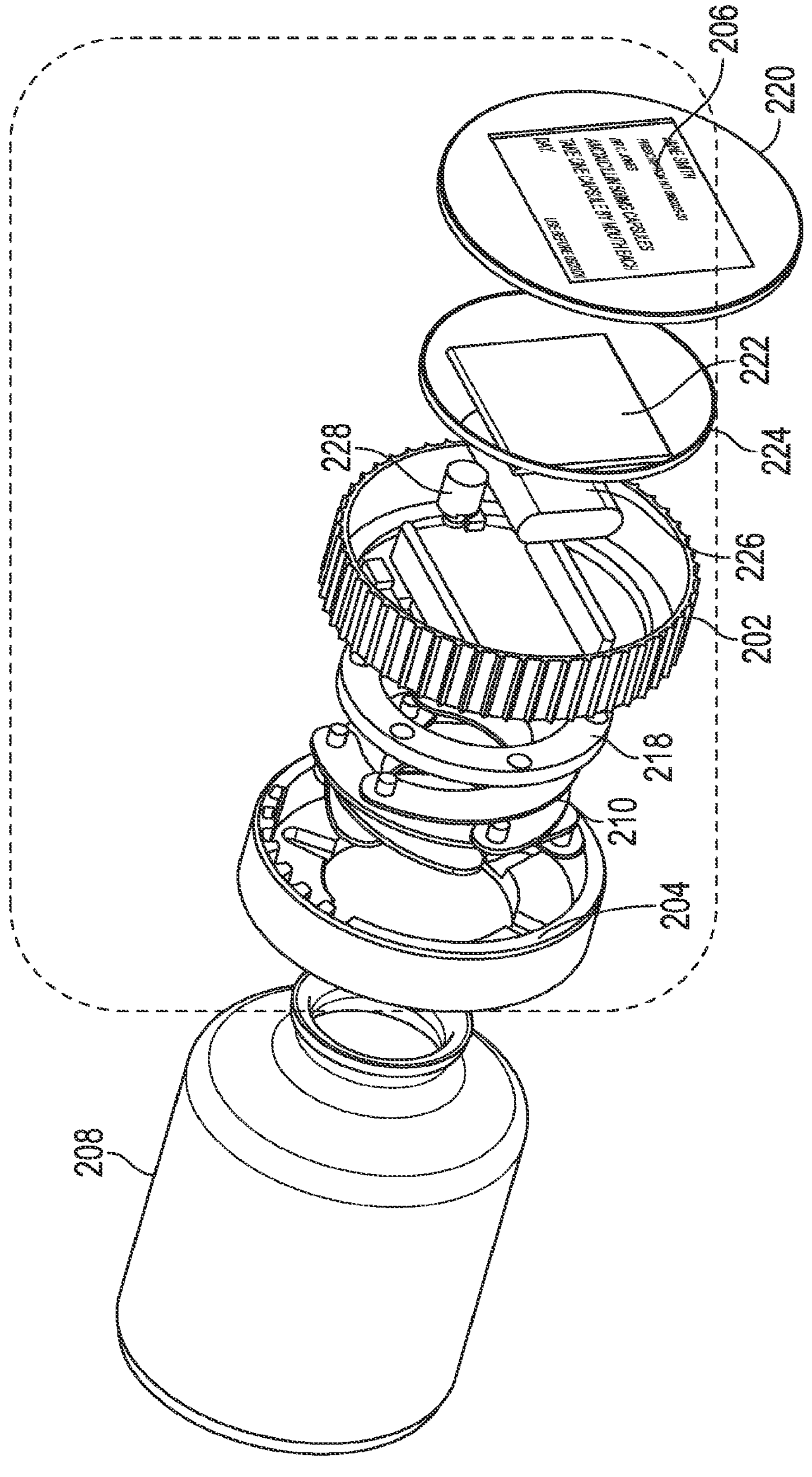
FIG. 3A depicts an exploded view of the locking cap assembly, according to aspects of the subject technology.

FIG. 3A depicts an exploded view of the locking cap assembly, according to aspects of the subject technology. FIG. 3A shows an exploded view of various components of the locking cap assembly 200. A top portion of the locking cap assembly 200 includes an upper housing cover 220 that surrounds the display 206. A circuit board 222 and a near field communication (NFC) antenna or coil 224 are positioned behind the upper housing cover. A super capacitor 226 and an electrical actuation component 228 are housed within the upper housing 202. The vane positioning ring 218 and the locking vanes 210 are housed within the lower housing 204.

Figure 3B:
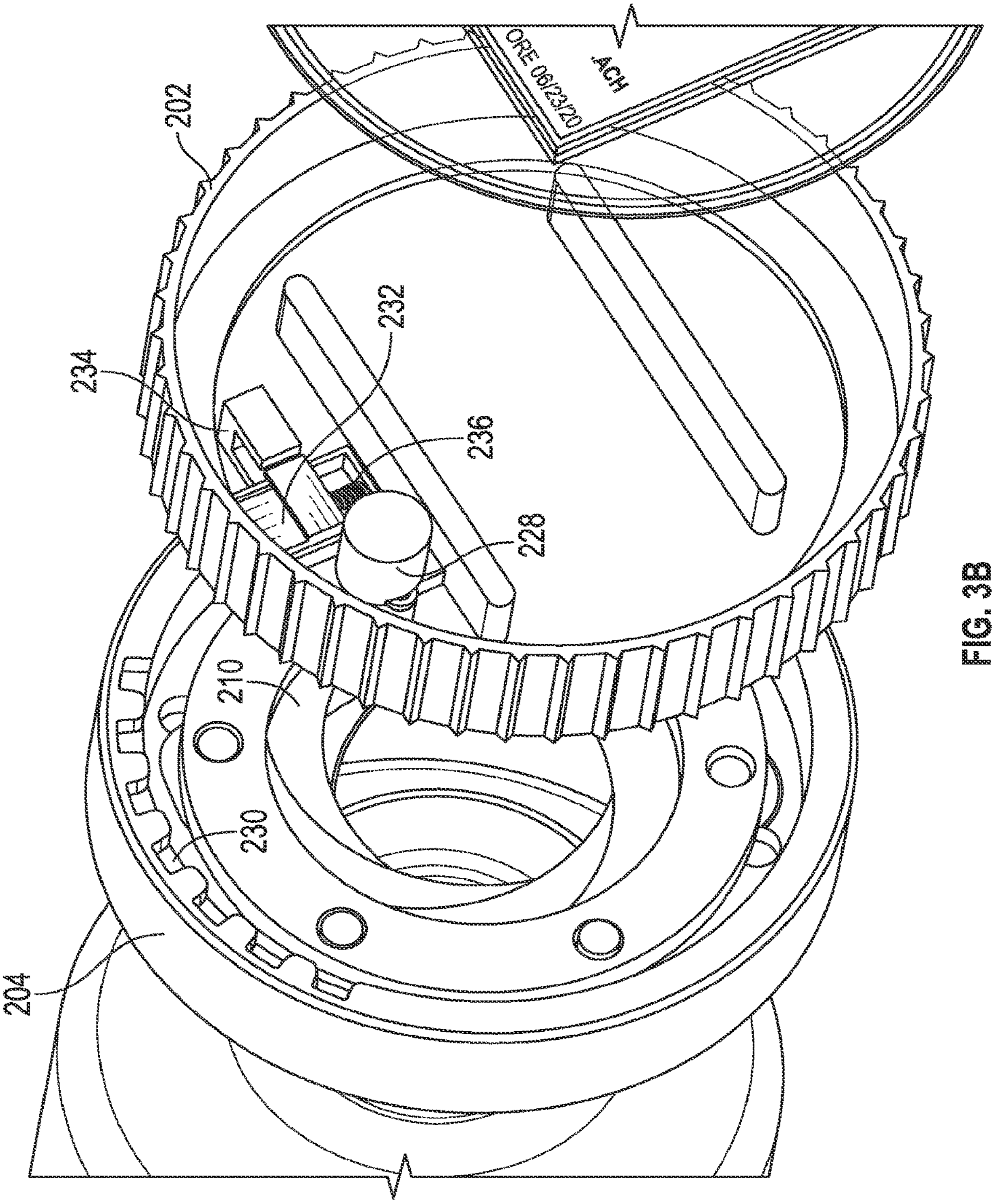
FIG. 3B shows a detailed view of components of the locking cap assembly, according to aspects of the subject technology.

FIG. 3B shows a detailed view of components of the locking cap assembly, according to aspects of the subject technology. FIG. 3B shows an exploded detail view of some components of the locking cap assembly 200. Within the upper housing 202 are the electrical actuation component 228, a locking latch 232, a latch position sensor 234, and a latch extension spring 236. The latch position sensor 234 is configured to sense a position of the locking latch 232 to determine if the locking latch 232 is positioned in a locked (extended) state or an unlocked (retracted) state. The latch extension spring 236 may control a movement of the locking latch 232 between the locked state and the unlocked state. The locking latch 232 is configured to prevent the upper housing 202 and the lower housing 204 from rotating with respect to each other. The electrical actuation component 228 is configured to lock and unlock the locking latch 232 responsive to a signal received from a microprocessor of the locking cap assembly and a current generated by an inductive charging coil of the locking cap assembly.

Within the lower housing 204 are the locking vanes 210 and a plurality of latch locking slots 230. The latch locking slots 230 are regularly spaced and each latch locking slot has a width that enables the slot to receive the locking latch 232 and to hold the locking latch 232 in an engaged position in the locked (extended) state. When one of the latch locking slots 230 is engaged by the locking latch 232, rotation between the upper housing 202 and the lower housing 204 is blocked, preventing the retraction of the locking vanes 210.

Figure 3C:
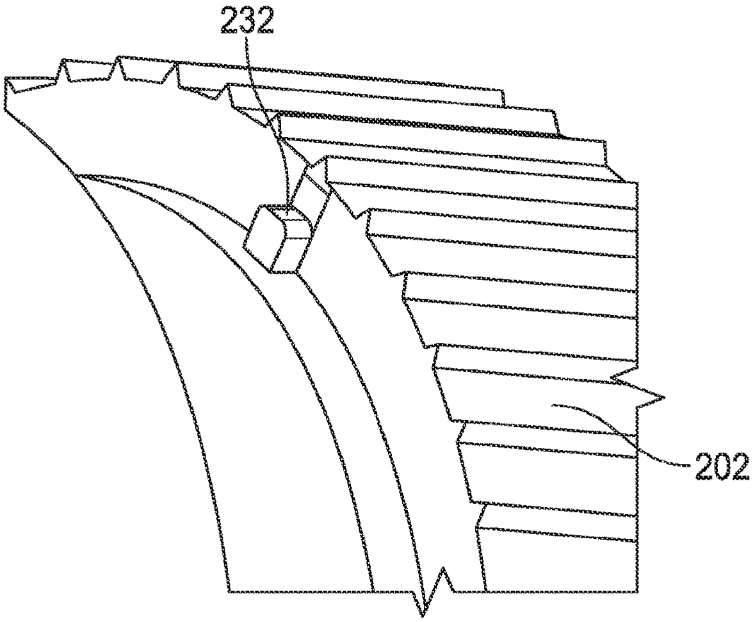
FIG. 3C shows a detailed view of a locking latch, according to aspects of the subject technology.

FIG. 3C shows a detailed view of a locking latch, according to aspects of the subject technology. FIG. 3C shows a detailed view of the locking latch 232 when the latch extension spring 236 is loaded. In some implementations, the spring 236 is loaded when it is compressed. When unlocked, the locking latch 232 is free to retract, allowing the locking cap assembly 200 to be turned (e.g., the upper housing 202 is twisted or rotated relative to the lower housing 204) so that the medicine bottle 208 may be opened. When locked, the locking latch 232 is prevented from retracting, blocking the locking cap assembly 200 from turning (e.g., the upper housing 202 is locked relative to the lower housing 204 such that rotations are prevented) and the locking vanes are locked in place, preventing the medicine bottle 208 from being opened.

Figure 3D:
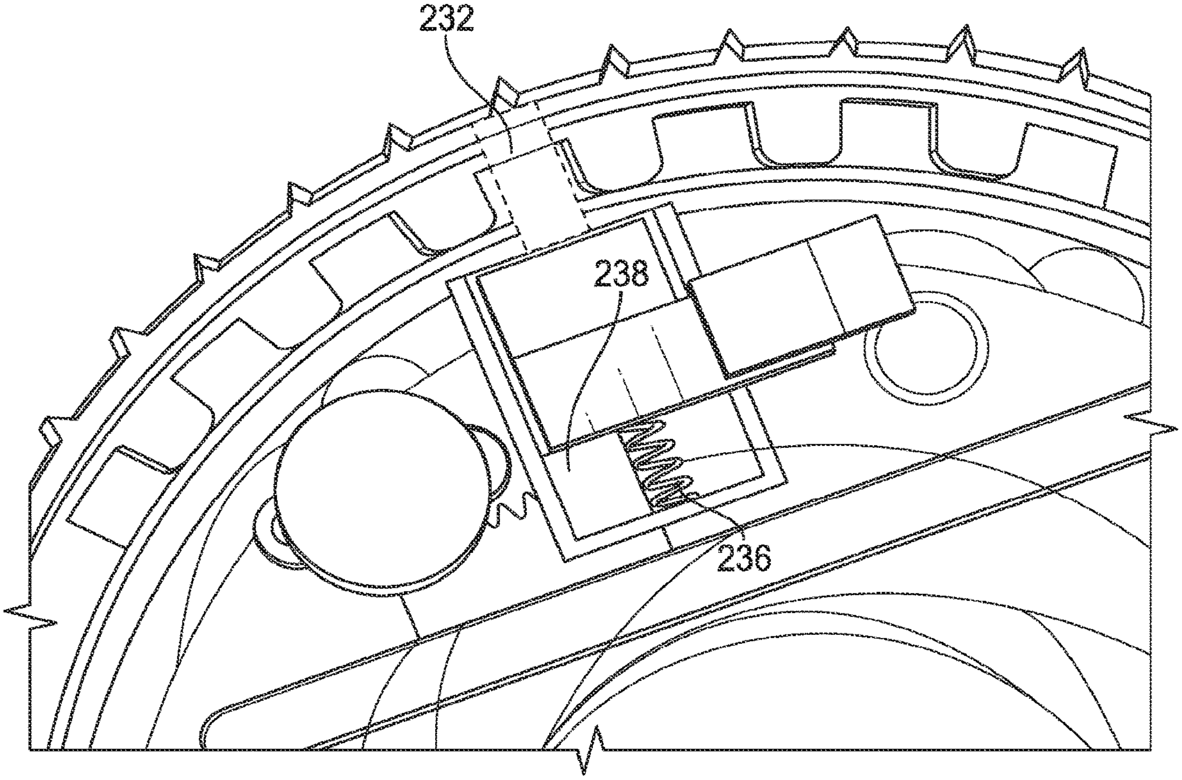
FIG. 3D shows a detailed view of a portion of the locking cap assembly in a locked state, according to aspects of the subject technology.

FIG. 3D shows a detailed view of a portion of the locking cap assembly in a locked state, according to aspects of the subject technology. FIG. 3D shows a detailed view of the locking cap assembly 200 in the locked state. In the locked state, a lock 238 is extended and prevents the locking latch 232 from retracting and prevents the locking cap assembly 200 from rotating. The lock 238 is extended when it moves to the right of the drawing, further away from the electrical actuation component 228. The electrical actuation component 228 actuates the lock 238 to move from left (unlocked state, the lock 238 positioned closer to the electrical actuation component 228) to right (locked state, the lock 238 positioned further from the electrical actuation component 228). In some implementations, the electrical actuation component 228 includes a lock motor. In some implementations, the electrical actuation component 288 includes a solenoid. In some implementations, the electrical actuation component 228 does not rotate. For example, the electrical actuation component 228 may be a linear actuator that retracts a lock mechanism.

When the lock 238 is engaged, the locking cap assembly 200 is not removed from the medicine bottle 208. In the locked state, the latch extension spring 236 is extended and the locking latch 232 extends/protrudes into, and is held within, the latch locking slot 230.

Figure 3E:
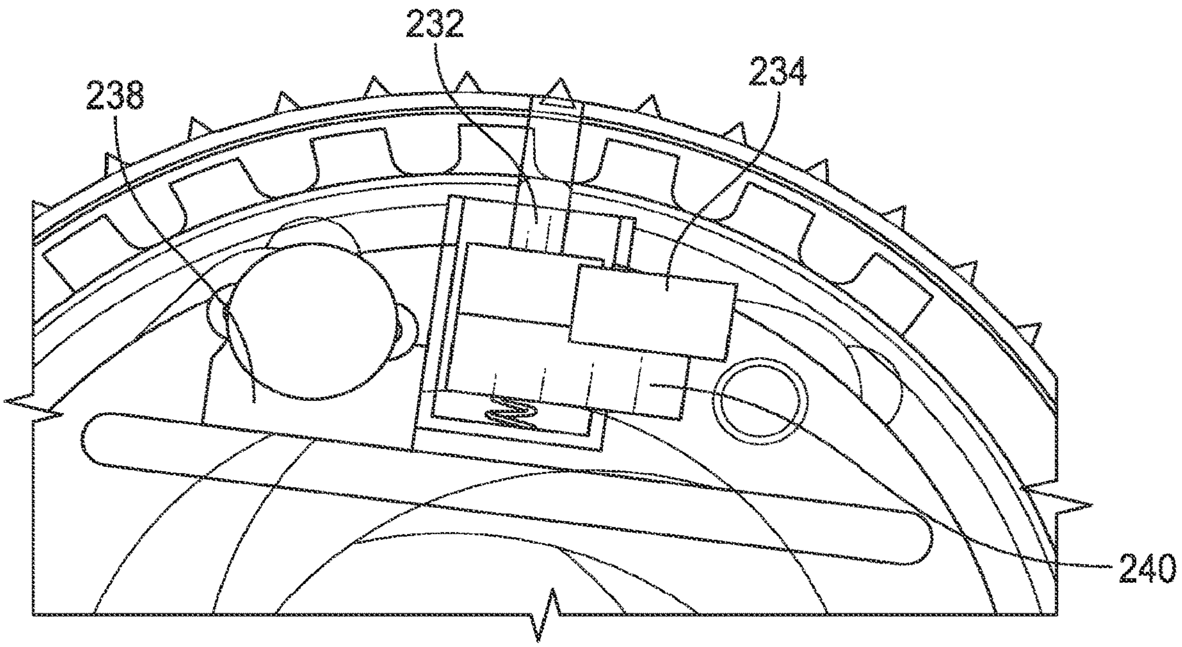
FIG. 3E shows a detailed view of a portion of the locking cap assembly in an unlocked state, according to aspects of the subject technology.

FIG. 3E shows a detailed view of a portion of the locking cap assembly in an unlocked state, according to aspects of the subject technology. FIG. 3E shows a detailed view of the locking cap assembly 200 in the unlocked state. In the unlocked state, the lock 238 is retracted (moves to the left of the drawing, closer to the electrical actuation component 228) and the locking latch 232 is free to retract. Once the locking latch 232 is retracted, the locking cap assembly 200 is able to rotate to retract the locking vanes 210, allowing the locking cap assembly 200 to be removed from the medicine bottle 208. In the locked state, shown in FIG. 3D, a latch position flag 240 interrupts signal from the latch position sensor 234 to indicate that the mechanism is locked. In the unlocked state, the latch position flag 240 no longer obscures the latch position sensor 234 and the locking cap assembly 200 is indicated as being unlatched.

Figure 3F:
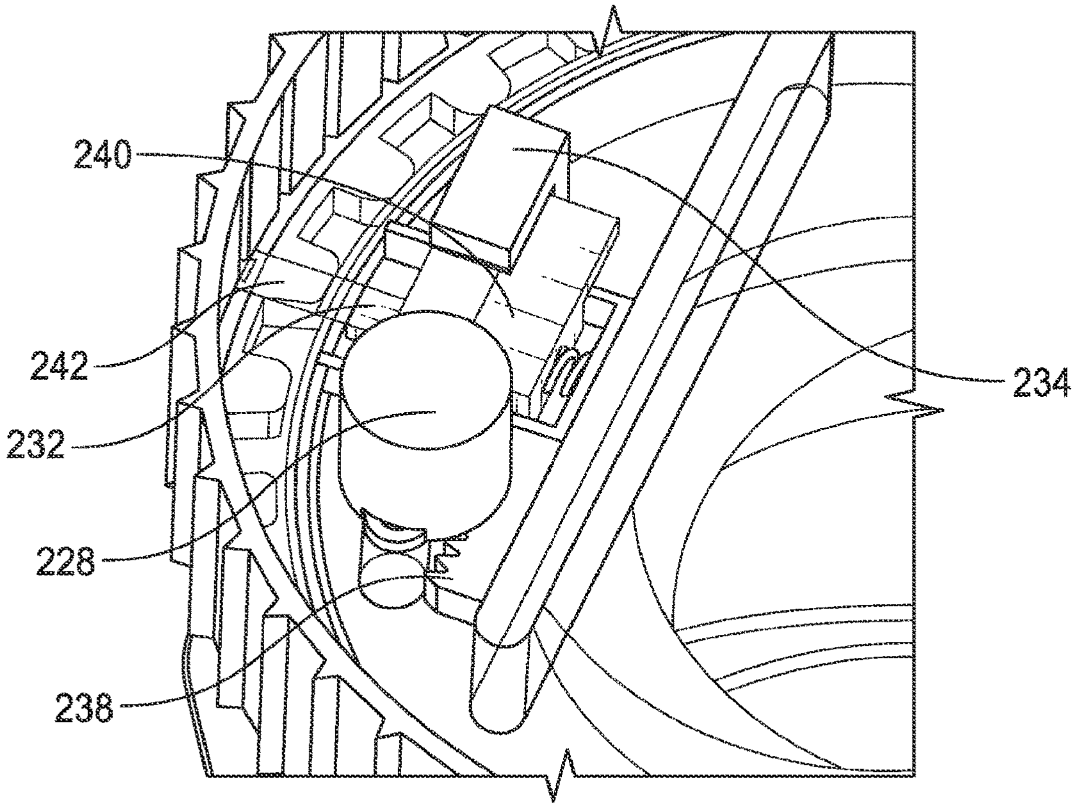
FIG. 3F shows a perspective view of a portion of the locking cap assembly in an unlocked state, according to aspects of the subject technology.

FIG. 3F shows a perspective view of a portion of the locking cap assembly in an unlocked state, according to aspects of the subject technology. FIG. 3F shows a detailed perspective view of the unlocked state. The lock 238 is retracted, and the latch position flag 240 is displaced from the latch position sensor 234. The locking latch 232 is also retracted, and is not engaged within a latch locking slot 230. Each pair of latch locking slot 230 is separated by a latch locking protrusion 242. The latch locking protrusion 242 is able to push the locking latch 232 and compress the latch extension spring 236 in the unlocked state.

Figure 3G:
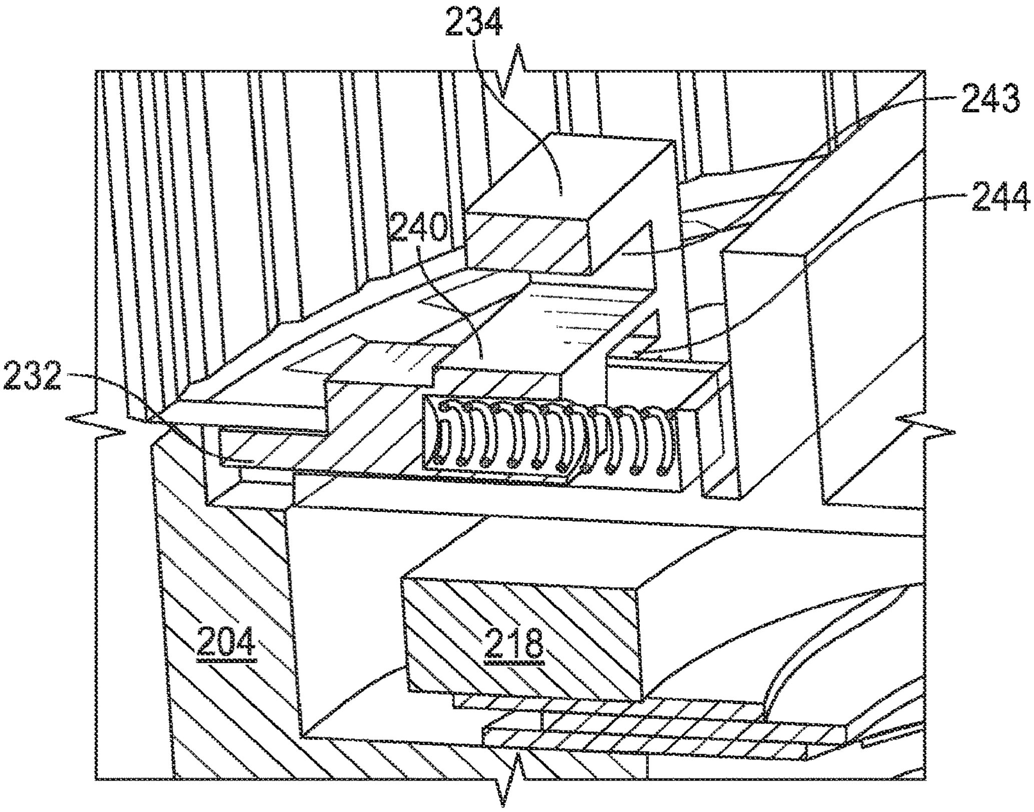
FIG. 3G shows a perspective view of a portion of the locking cap assembly in a locked state, according to aspects of the subject technology.

FIG. 3G shows a perspective view of a portion of the locking cap assembly in a locked state, according to aspects of the subject technology. FIG. 3G shows a detailed cross-sectional perspective view of the locked state. The locking latch 236 in the extended position, and is engaged within a latch locking slot 230. The latch extension spring 236 is extended in the locked state. The latch position flag 240 is underneath the latch position sensor 234 and interrupts a signal between a top portion 243 of the latch position sensor 234 and a bottom portion 244 of the latch position sensor. The interrupted signal indicates that the mechanism is locked.

Figure 3H:
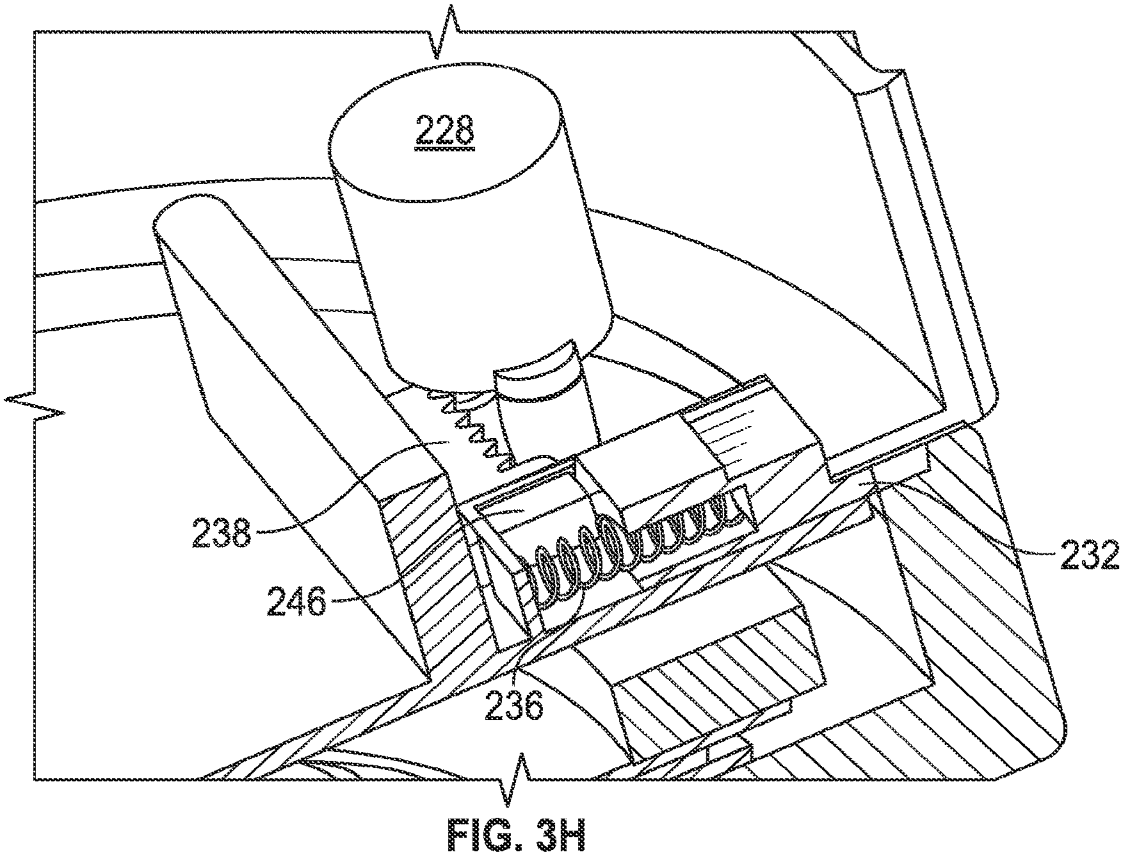
FIG. 3H shows a perspective view of a portion of the locking cap assembly in a locked state, according to aspects of the subject technology.

FIG. 3H shows a perspective view of a portion of the locking cap assembly in a locked state, according to aspects of the subject technology. FIG. 3H shows a detailed cross-sectional perspective view of the locked state. The electrical actuation component 228 has not fully retracted the lock 238 and a portion 246 of the lock 238 remains in contact with the latch position flag 240, preventing the latch 232 from retracting. In some implementations, the lock 238 includes a series of teeth that engages a corresponding part of the electrical actuation component 228 to cause the lock 238 to be actuated.

In some implementations, the electrical actuation component is coupled to the vane positioning ring or to the lower housing 204 and configured to cause a motor-driven rotation of the upper housing 202 with respect to the lower housing 204 to lock or unlock the locking cap assembly 200 onto the medicine bottle 208 responsive to a signal received from the microprocessor. Such implementations may use a larger motor and more power to actuate or cause the rotations. A separate lock may additionally be provided to prevent turning the larger motor, which would be connected to the locking cap assembly cap. A size of the locking cap assembly cap may be increased, and more power, in addition to that provided by the NFC coil, may be used.

In some implementations, the locking cap assembly may include a solenoid that disengages the lock.

Figure 4A:
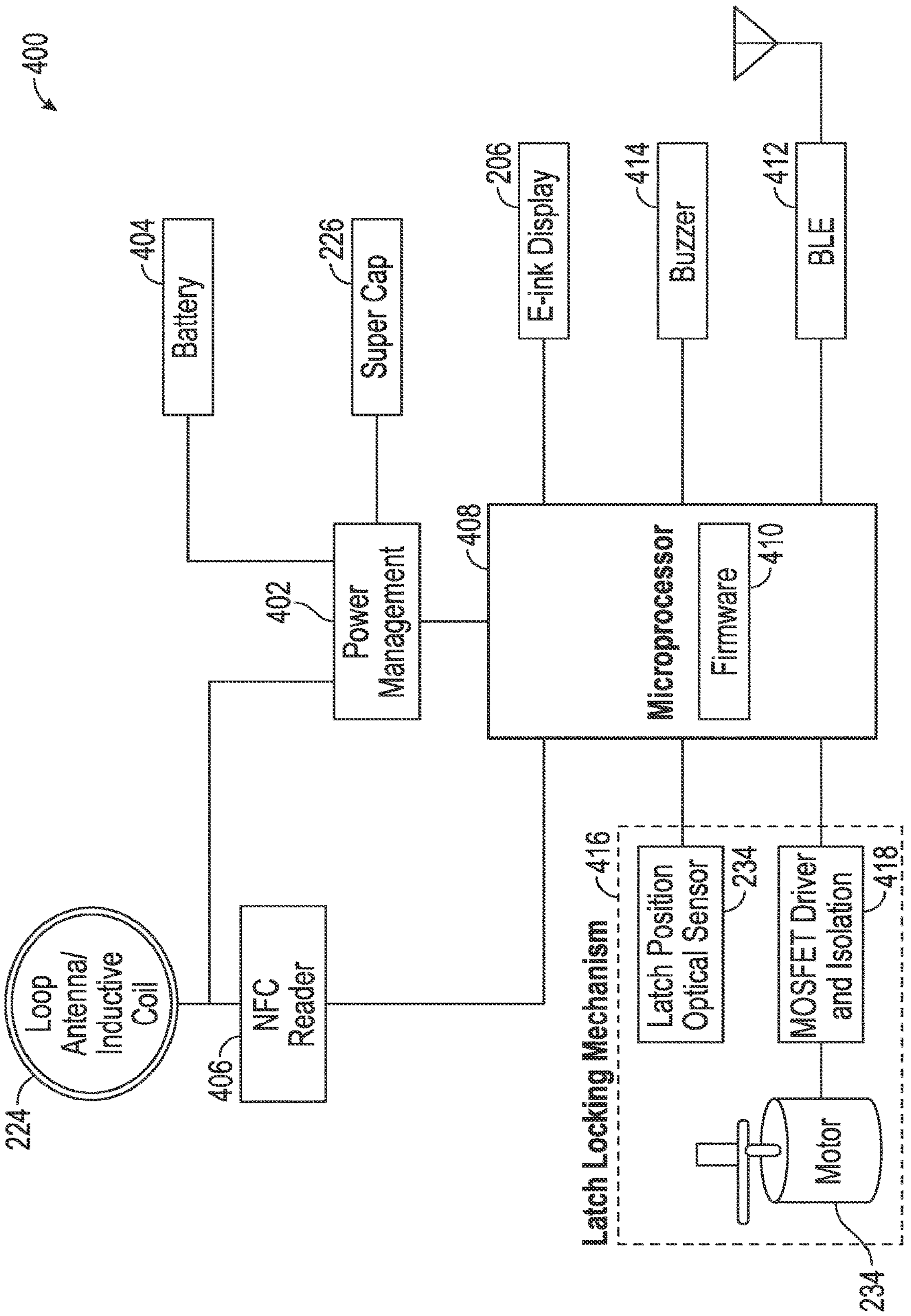
FIG. 4A depicts a system architecture of the locking cap assembly, according to aspects of the subject technology.

FIG. 4A depicts a system architecture of the locking cap assembly, according to aspects of the subject technology. FIG. 4A shows a system architecture 400 of the hardware components of the locking cap assembly 200. A microprocessor 408 positioned on the circuit board 222 controls various components of the locking cap assembly 200. The microprocessor 408 having associated firmware 410 controls the display 206, a power management system 402, a NFC reader 406, an output device 414 such as a buzzer, a Bluetooth communication module 412. The output device 414 may emit a human perceivable output such as audio or vibration. The microprocessor 408 also controls a latch locking mechanism 416 which includes the latch position sensor 234, a MOSFET driver and isolation system 418, and the electrical actuation component 228.

The power management system 402 controls one or more energy sources: a battery 404, the super capacitor 226, and charging by the inductive charging coil 224. The battery 404 may provide higher energy density for storage, while the super capacitor 226 may have more rapid charge and discharge capabilities. The potential energy in the super capacitor 226 may be stored in an electric field, whereas the battery 404 may store its potential energy in a chemical form.

In some implementations, the locking cap assembly 200 includes either (i) the battery 404, or (ii) the super capacitor 226 and the inductive charging coil 224. In some implementations, a primary coil in a charging device (e.g., a cell phone) induces a current in the NFC coil 224 coil of the locking cap assembly 200 to reverse wireless charge the locking cap assembly 200. The reverse wireless charge may be carried out by placing the cell phone and the locking cap assembly 200 together in close proximity. The NFC circuit in the container may be configured to conduct energy harvesting to harvest the NFC signal transmitted by the charging device, or may utilize NFC specific energy transfer to receive and/or transmit energy. Energy may also be received and/or transmitted using Qi standard, or similar standard, using reverse charging capability where a device (e.g., phone) can wirelessly power an accessory.

The energy transferred by a charging device to the locking cap assembly 200 over a short period of time (e.g., the time to request access) is typically on the order of a couple hundred milliwatts. In this regard, the locking cap assembly 200 may be configured to harvest energy from the charging device to cause the motor or actuator to operate. The locking cap assembly 200 may include (e.g., within the cap) a small storage device such as a battery or super capacitor to allow storage of harvested power and a smooth transfer of the power over time. In some implementations, the locking cap assembly 200 may be configured to operate in standby mode until a command to open is received from the charging device or other NFC device in order to conserve energy. In standby mode, resource consuming functions may be disabled or operated in a low power state.

The NFC coil 224 may also send or receive communication signals that are sent to the NFC reader 406 to be decoded. The communication signals may provide information for displaying on the display 206, or may provide a locking status of the locking cap assembly 200 (e.g., whether it is in the locked or unlocked state). The NFC reader 406 may relay the information to the microprocessor 408. In cases where the locking cap assembly 200 is expected to be in a locked state (based on information received from the NFC coil 224) but the microprocessor 408 determines that it is in fact in an unlocked state (based on information from the latch position sensor 234), the microprocessor can send control signals to trigger an alarm by activating the output device 414. Similar alerts about the locking state of the locking cap assembly 200 may also be sent and received using the BLE module 412. In addition to receiving the sensor signals from the latch position sensor 234, the microprocessor 408 also controls the latch locking mechanism 416 via the MOSFET driver and isolation system 418. The isolation system 418 sends control signals to drive the electrical actuation component 228.

In some implementations, the BLE module 412 is able to monitor if a medicine bottle secured by the locking cap assembly 200 is removed from a particular location. The BLE module allows the locking cap assembly 200 to communicate with other BLE-enabled device(s) in a vicinity of the locking cap assembly, to indirectly provide location information about the locking cap assembly. The locking cap assembly 200 may thus additionally support a "Find my container" functionality that allows a user to communicate with the locking cap assembly 200, via BLE module. The locking cap assembly 200 can further include electronics that allows it to sound an alarm when triggered by the "Find my container" functionality. Alternatively, or in addition, the BLE module 412 can communicate with a user device (e.g., cell phone) and provide location information of the locking cap assembly 200 to the user device.

Figure 4B:
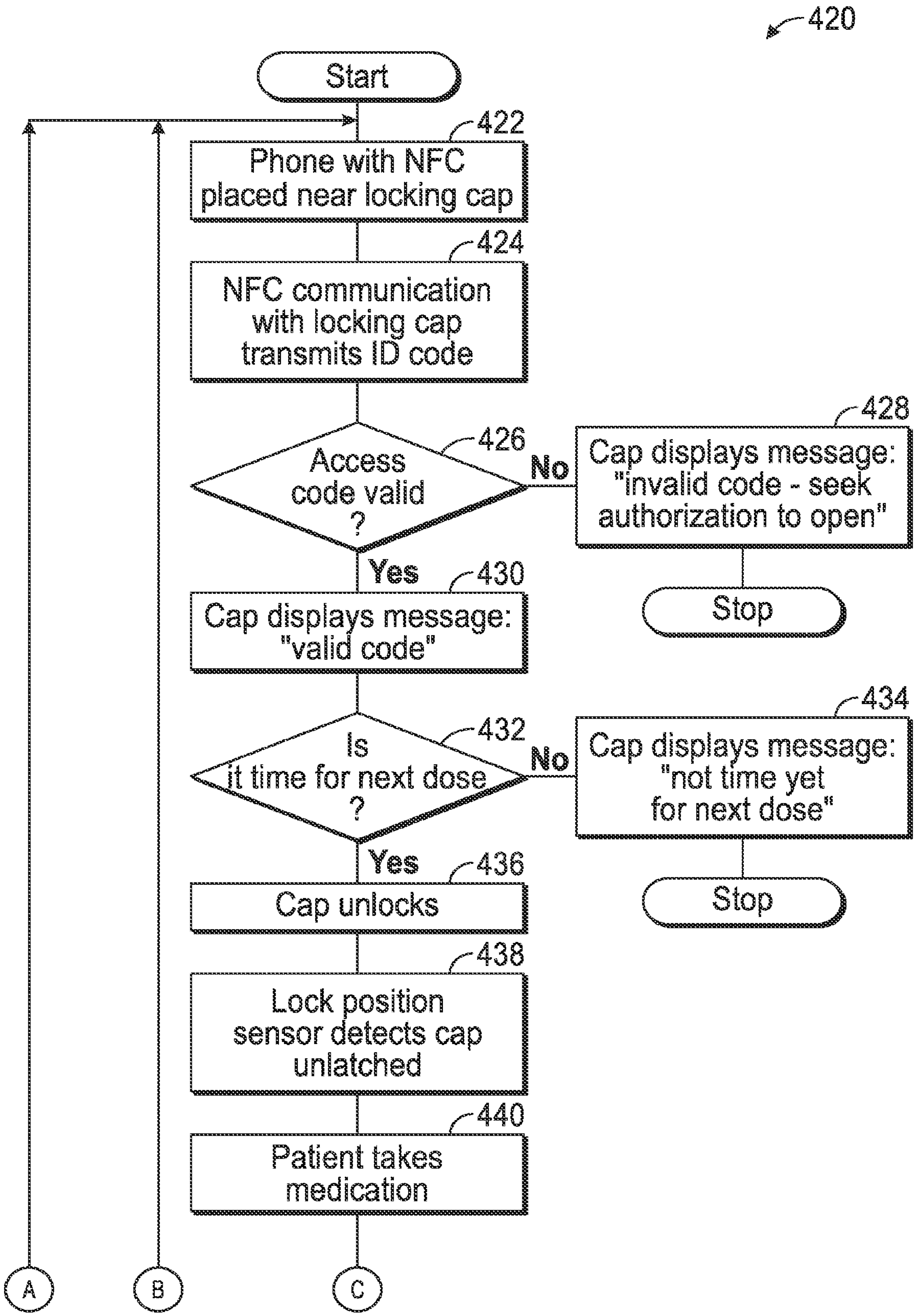
FIG. 4B depicts a locking cap assembly functional flowchart, according to aspects of the subject technology.
Figure 4B:
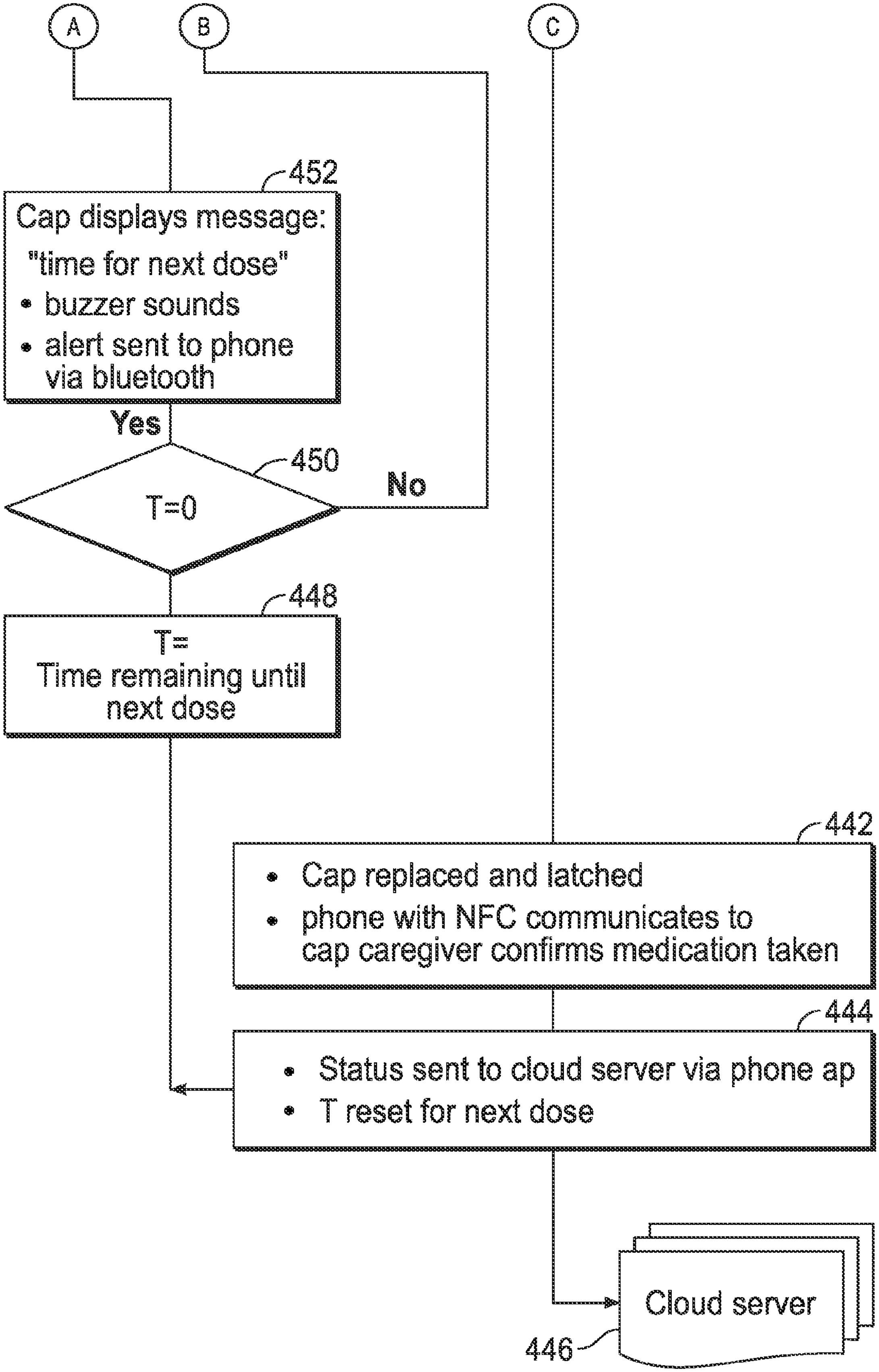

FIG. 4B depicts a locking cap assembly functional flowchart, according to aspects of the subject technology. FIG. 4B shows a locking cap functional flowchart 420. The process starts with a phone having NFC capability being placed near the locking cap assembly 200 (422). The locking cap assembly 200 receives an ID code or access code via NFC communication from the phone (424).

The microprocessor 408 determines whether the ID code represents a valid access code (426). In accordance with a determination that the ID code is not valid, the display 206 shows an error message (428). For example, the display 206 may show an error message stating: "invalid code—seek authorization to open". In accordance with a determination that the ID code is valid, the display 206 shows a confirmation message (430). For example, the display 206 may show a confirmation message stating: "Valid code".

The microprocessor 408 determines whether it is time for a next dose of medication (432). In accordance with a determination that it is not yet time for the next dose of medication, the display 206 shows an error message (434). For example, the display 206 may show an error message stating: "not time yet for the next dose." Such a feature helps patients who may require help with safely self-administering medicine by preventing accidental overdose caused by the patient prematurely taking an additional dose. For example, the patient is no longer required to remember the exact time the last dose was taken and/or calculate when the next dose is due. In accordance with a determination that it is time for the next dose, the locking cap assembly 200 unlocks (436). Due to the unlocking of the locking cap assembly 200, the latch position sensor 234 detects the locking cap assembly 200 is unlatched (438). Medication may be retrieved by a patient after the locking cap assembly 200 is unlatched (440).

After the medication has been retrieved, the cap may be replaced and latched. The locking cap assembly 200 communications via NFC communication to the phone, and the phone relays information to a caregiver confirming that the medication has been administered (442). The status information may be sent to a cloud server via a phone app (446), and the time is reset locally (by the microprocessor 408) for the next dose (444). The microprocessor 408 calculates a time (T) which corresponds to the time remaining until next dose (448).

The microprocessor 408 determines if T has decreased to zero, indicating that it is time for the next dose (450). In accordance with a determination that it is not yet time for the next dose of medication, the system simply loops through the functional flowchart again. In accordance with a determination that it is time for the next dose (i.e., T=0), the microprocessor 408 causes an alert message to be displayed on the display 206. For example, the alert message may state: "Time for the next dose." The microprocessor 408 may additionally trigger the output device 414 to notify the patient and/or the caregiver that it is time for the next dose. The microprocessor 408 may also cause an alert to the sent to the phone via the BLE module 412. After the alerts are sent out, the process is looped through when the phone is placed near the locking cap assembly 200 (422).

As used herein, a "cap" may refer to a lid, a cover, or other releasable (e.g., lockable and unlockable) element that secures an opening for a container such as a bottle, tray, or bin. In some implementation, the locking vane or other actuated locking element is described as being secured "about the container." Some implementations may secure the vane or other actuated locking element to a portion of the container such as a post or other protrusion affixed to the container.

Figure 5A:
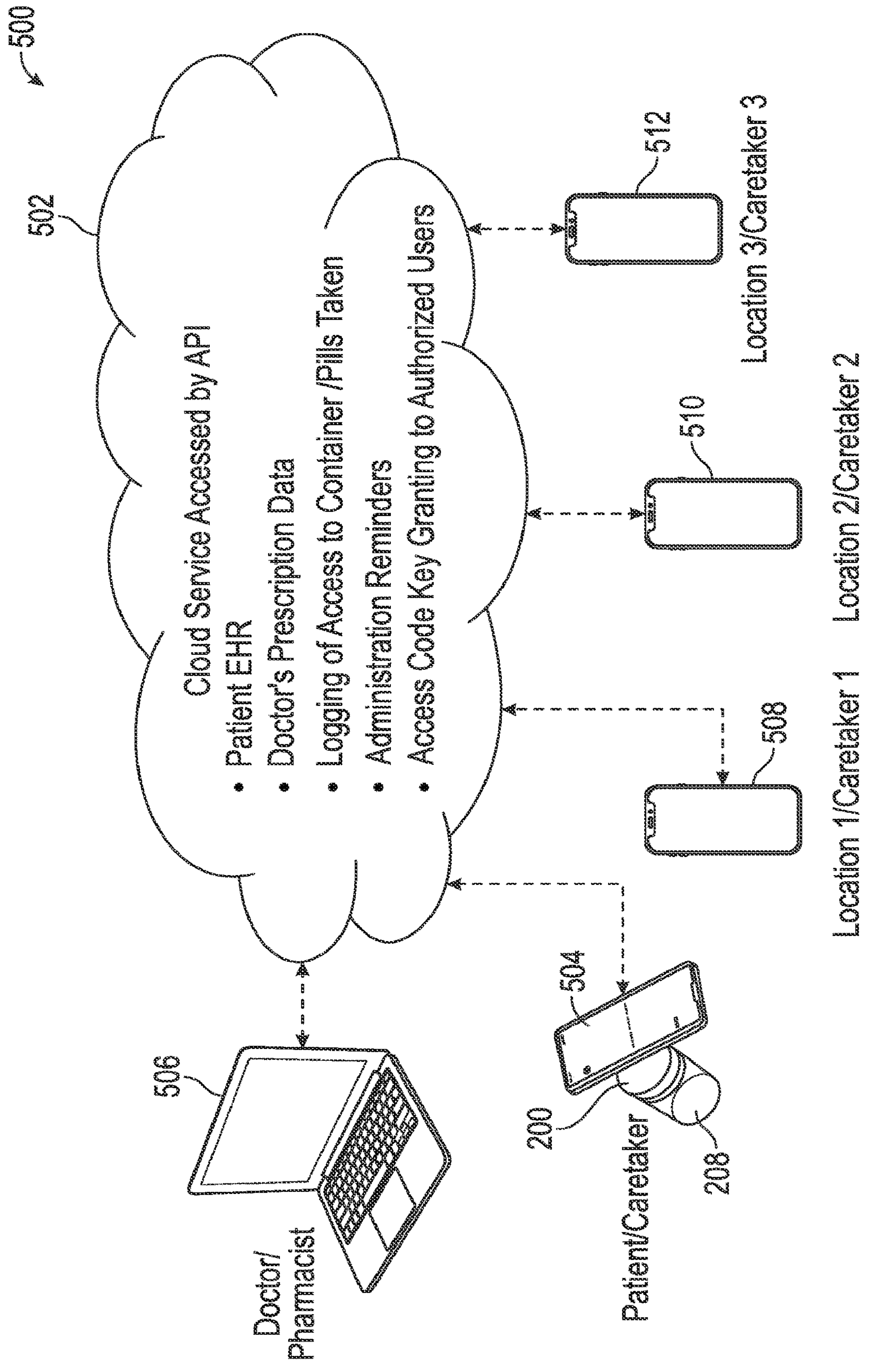
FIG. 5A depicts a system used to control a locking cap assembly, according to aspects of the subject technology.

FIG. 5A depicts a system used to control a locking cap assembly, according to aspects of the subject technology. FIG. 5A shows a system 500 that allows portability of access to medication. The access to medication may be transferred by transferring the access code key to selected caregivers. Pertinent information and logs of medication administration (time and dose administered) may be stored in the cloud server, and accessed via phones or other devices.

The system 500 includes a cloud server 502 that is in data communication with a phone 504. The data communication may be established using WiFi signals. The phone 504 is in close proximity to the locking cap assembly 200 securing the medicine bottle 208. A doctor or pharmacist using a terminal 506 may establish a data connection to the cloud server 502, allowing the terminal 506 to access and/or edit a patient's electronic health record (EHR).

A doctor may send prescription data to the cloud server 502. The phone 504 may provide information that logs the access to the medicine bottle 208 and the medication (e.g., pills) that are taken from the medicine bottle 208. The phone 504 may provide the information, for example, according to step 446 of the example flowchart 420, to the cloud server 502. In some implementations, an application on the phone coordinates (i) the exchange of information between the cloud server 502 and the phone, and (ii) the communication between the phone and the locking cap assembly. The application that controls the unlocking may be maintained in the cloud server 502, and may allow an access key (e.g., the authorization code) to be provided to phones of different authorized users. For such cases, the medication container can be carried by the patient, and control or reminders are transferred to one or more caretakers. For example, the access key may be transferred to different caregivers at different locations responsible for the care of an incapacitated person who is being transferred to the different locations. A child may also carry her medication with her to school, and the access key may be provided to a school nurse so the school nurse can administer the medication to the child. The cloud server 502 can keep a data log record of when the medication was administered, and an identity of the person administering the medication, and the time remaining until the next dose of the medication is to be administration. The application on the phone enables exchange of information between the phone and the cloud server 502.

In some implementations, the user of the phone 504 is the patient who has a prescription to the medication contained in the medicine bottle 208. The cloud server 502 may deliver reminder messages to the phone 504 to remind the patient to take a next dose of the medication. In some implementations, the user of the phone 504 is a caretaker. The cloud server 502 may deliver reminder messages to the phone 504 to remind a caretaker to administer the medication to the patient. In some implementations, the reminder sent by the cloud server 502 to the phone 504 may trigger a charging window during which wireless power transmission may be received by the locking cap assembly 200, in additional to receiving a communication signal from the phone 504 to unlock the locking cap assembly 200.

A first additional device 508 (e.g., a phone) of a first caretaker at a first location may also be in data connection to the cloud server 502. A second additional device 510 (e.g., a phone) of a second caretaker at a second location may also be in data connection to the cloud server 502. A third additional device 512 (e.g., a phone) of a third caretaker at a third location may also be in data connection to the cloud server 502.

In some implementations, the first location, the second location and the third location are all at the same location (e.g., a hospital). The first, second, and third caretakers may be nurses working different shifts. The cloud server 502 is configured to send an access code key granting access to authorized users to each of the nurses at the beginning of their shifts. After administering the medication, one or more of the devices 508, 510, and 512 may provide information that logs the access to the medicine bottle 208 and the medication (e.g., pills) that are taken from the medicine bottle 208. The devices 508, 510, and 512 may provide the information, for example, according to step 446 of the example flowchart 420, to the cloud server 502.

Figure 5B:
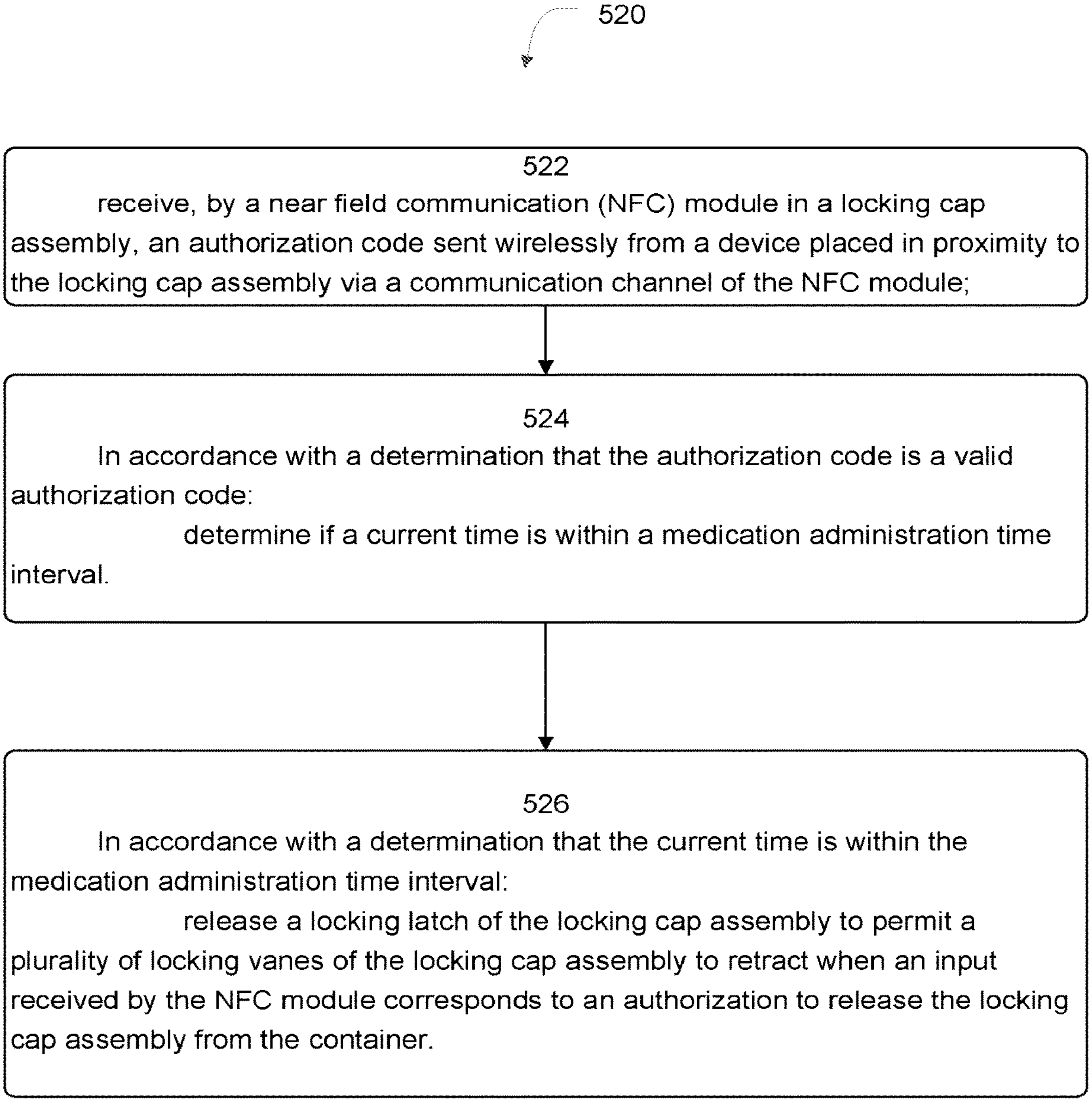
FIG. 5B depicts an example method for securing a medicine container, according to aspects of the subject technology.

FIG. 5B depicts an example method for securing a medication container, according to aspects of the subject technology. A locking cap assembly receives, using a near field communication (NFC) module, an authorization code sent wireless from a device placed in proximity to the locking assembly via a communication channel of the NFC module (522). A microprocessor of the locking cap assembly determines if the authorization is a valid authorization code. The microprocessor is configured to receive the NFC input from the NFC module and to unlock the locking latch 232 and permit the rotation of upper housing 202 with respect to the lower housing 204 in a second direction to retract the plurality of locking vanes and release the lower housing 204 from the medicine bottle 208 responsive to the microprocessor determining that the NFC input received by the NFC module corresponds to an authorization to release the locking cap assembly 200 from the medicine bottle 208.

In accordance with a determination that the authorization code is a valid authorization code, determine if a current time is within a medication administration time interval (524). In accordance with a determination that the current time is within the medication administration time interval: release a locking latch of the locking cap assembly to permit a plurality of locking vanes of the locking cap assembly to retract when an input received by the NFC module corresponds to an authorization to release the locking cap assembly from the container (526).

In some implementations, the first location, the second location and the third location are at different locations. For example, the first, second, and third caretakers may be extended family members of the patient and may live at different places. When a patient has failed to take a medication, one or more of the first, second, and third caretaker may be notified by the cloud server 502, and they may go to the location of the patient to help with administering the medication.

In some implementations, a locking cap assembly includes an upper housing, a lower housing rotatably connected to the upper housing and configured to be fitted onto a container, a near field communication (NFC) module configured to wirelessly receive a NFC input, an inductive charging coil, a microprocessor; and a latching mechanism. The latching mechanism includes: a locking latch configured to prevent the upper housing and the lower housing from rotating with respect to each other; and an electrical actuation component configured to lock and unlock the latch responsive to a signal received from the microprocessor and a current generated by the inductive charging coil. The lower housing includes a plurality of locking vanes within the lower housing, the locking vanes being configured to variably define an inner diameter size of the lower housing responsive to a rotation of the upper housing with respect to the lower housing when the lower housing is mechanically engaged with the container. When the locking cap assembly is configured to lock onto the container by contracting the plurality of vanes about the container responsive to a rotation of the upper housing with respect to the lower housing in a first direction. The microprocessor is configured to receive the NFC input from the NFC module and to unlock the locking latch and permit the rotation of upper housing with respect to the lower housing in a second direction to retract the plurality of locking vanes and release the lower housing from the container responsive to the microprocessor determining that the NFC input received by the NFC module corresponds to an authorization to release the locking cap assembly from the container.

In some implementations, the locking cap assembly further includes a vane positioning ring within the lower housing, the vane positioning ring being coupled to the plurality of locking vanes and to the upper housing. The vane positing ring extends or retracts the plurality of locking vanes when the vane positioning ring is rotated, together with the upper housing, relative to the lower housing. In some implementations, the locking cap assembly further includes a plurality of locking slots positioned within the lower housing. The locking latch is configured to engage one of the plurality of locking slots from the upper housing.

In some implementations, a display disposed is in the upper housing, the display is configured to present a unique identifier associated with a medication in the container and a recipient of the medication. The locking cap assembly is configured to transmit the unique identifier to a device proximate to the locking cap assembly, and receive the authorization, via the NFC module, from the device proximate to the locking cap assembly after the unique identifier is transmitted to and read by the device.

In some implementations, the locking cap assembly further includes electrical components to receive wireless power charging from the device to power an electrical actuation component of the locking cap assembly. The lower housing is positioned between the upper housing and the container.

In some implementations, the electrical actuation component is coupled to the vane positioning ring and configured to cause a motor-driven rotation of the upper housing with respect to the lower housing to lock or unlock the locking cap assembly onto the container responsive to the signal received from the microprocessor.

In some implementations, the locking cap assembly further includes an optical sensor configured to determine a position of the locking latch for determining a locking state of the locking cap assembly.

In some implementations, the locking cap assembly further includes an output device (e.g., within the cap), such as a buzzer, configured to emit a human perceivable output (e.g., audio, a sound, vibration) at a predetermined time prior to a scheduled administration of a medication in the container. The NFC module is configured to communicate information to a data network responsive to a determination that the locking cap assembly is unlocked from the container.

In some implementations, a method of securing a medication container, the method includes receiving, by a near field communication (NFC) module in a locking cap assembly, an authorization code sent wirelessly from a device placed in proximity to the locking cap assembly via a communication channel of the NFC module. In accordance with a determination that the authorization code is a valid authorization code, determining if a current time is within a medication administration time interval. In accordance with a determination that the current time is within the medication administration time interval: releasing a locking latch of the locking cap assembly to permit a plurality of locking vanes of the locking cap assembly to retract when an input received by the NFC module corresponds to an authorization to release the locking cap assembly from the container. The plurality of locking vanes variably defines a size of a central opening, and the plurality of locking vanes is configured to be mechanically engaged with the medication container in a locked state of the locking cap assembly. The electrical power for releasing the locking latch is provided by a wireless energy transfer from the device via the communication channel to a motor of the locking cap assembly.

In some implementations, the method further includes receiving the authorization code sent by a device after the device reads, using an NFC module of the device, a unique identifier associated with the locking cap assembly.

In some implementations, the method further includes storing, in a data network, authorization information for unlocking the medication container so that the medication container is configured to be unlocked by a plurality of authorized mobile terminals that retrieves the authorization information over the data network.

In some implementations, the method further includes the device being a cell phone, and the valid authorization code is transmitted as a cryptographic hash code from the cell phone to the locking cap assembly, and the locking cap assembly includes a decryption key for decrypting the valid authorization code.

In some implementations, the method further includes sending, via the NFC module of the locking cap assembly, data to a data network after the medication container has been unlocked; and maintaining, at the data network, a record of when medication in the medication container is administered.

In some implementations, the method further includes sounding an alarm in the locking cap assembly at a predetermined time prior to a scheduled subsequent administration of medication in the medication container.

Figure 6:
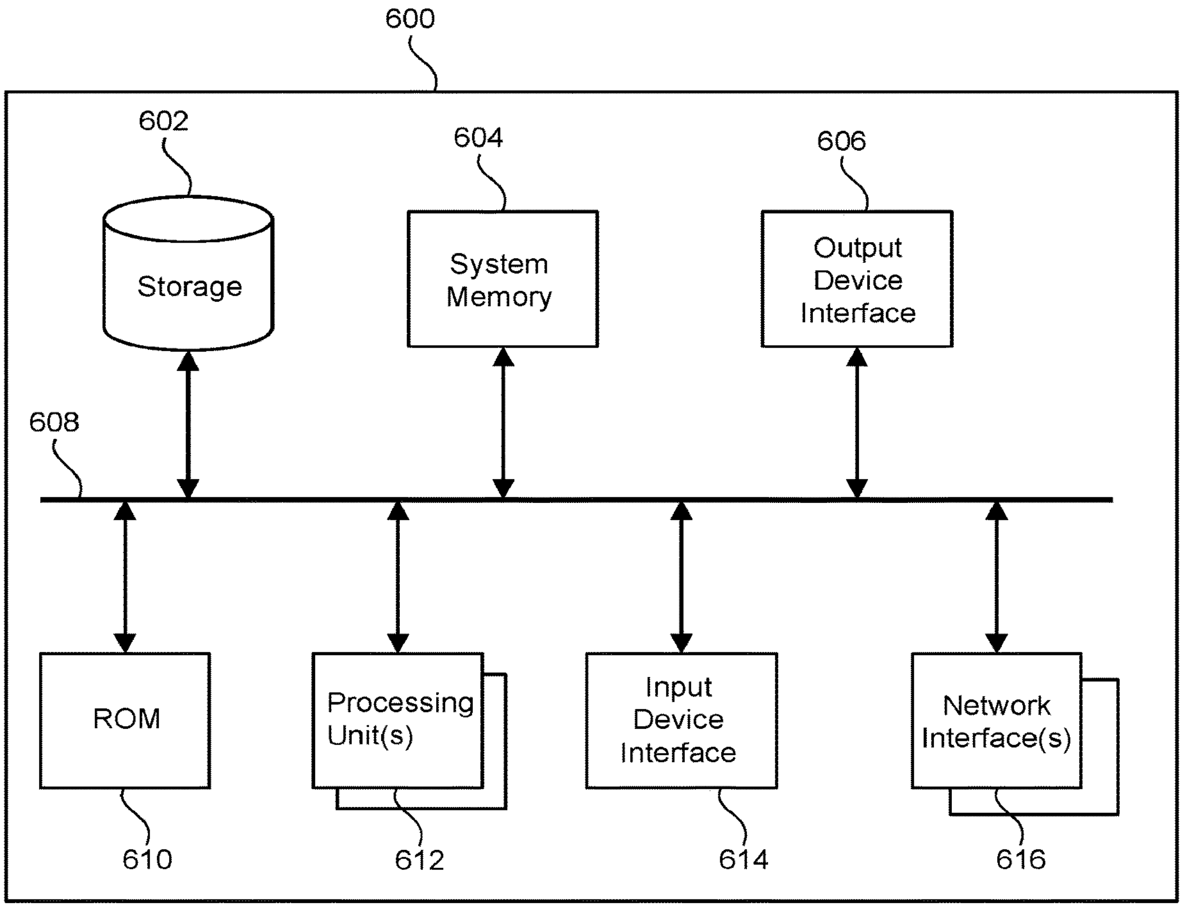
FIG. 6 is a conceptual diagram illustrating an example electronic system for controlling a locking cap assembly, according to aspects of the subject technology.

In some implementations, the method further includes updating a display on the locking cap assembly after the medication container has been unlocked to provide dosage or other information relating to medication in the medication container. In some implementations, the method further includes transferring an access code for releasing the locking cap assembly from a first authorized mobile device to a second authorized mobile device. FIG. 6 is a conceptual diagram illustrating an example electronic system for controlling a locking cap assembly, according to aspects of the subject technology. Electronic system 600 may be a computing device for execution of software associated with one or more portions or steps of process, or components and processes provided by FIGS. 1-5B, including but not limited to server 130, computing hardware within patient care device 12, or terminal device 132. Electronic system 600 may be representative, in combination with the disclosure regarding FIGS. 1-5B. In this regard, electronic system 600 may be a personal computer or a mobile device such as a smartphone, tablet computer, laptop, PDA, an augmented reality device, a wearable such as a watch or band or glasses, or combination thereof, or other touch screen or television with one or more processors embedded therein or coupled thereto, or any other sort of computer-related electronic device having network connectivity.

Electronic system 600 may include various types of computer readable media and interfaces for various other types of computer readable media. In the depicted example, electronic system 600 includes a bus 608, processing unit(s) 612, a system memory 604, a read-only memory (ROM) 610, a permanent storage device 602, an input device interface 614, an output device interface 606, and one or more network interfaces 616. In some implementations, electronic system 600 may include or be integrated with other computing devices or circuitry for operation of the various components and processes previously described.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, and/or ROM 610. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, e.g., alphanumeric keyboards and pointing devices (also called "cursor control devices"). Output device interfaces 606 enables, e.g., the display of images generated by the electronic system 600. Output devices used with output device interface 606 include, e.g., printers and display devices, such as cathode ray tubes (CRT) or liquid crystal displays (LCD). Some implementations include devices such as a touchscreen that functions as both input and output devices.

Also, as shown in FIG. 6, bus 608 also couples electronic system 600 to a network (not shown) through network interfaces 616. Network interfaces 616 may include, e.g., a wireless access point (e.g., Bluetooth or WiFi) or radio circuitry (e.g., transceiver, antenna, amplifier) for connecting to a wireless access point. Network interfaces 616 may also include hardware (e.g., Ethernet hardware) for connecting the computer to a part of a network of computers such as a local area network ("LAN"), a wide area network ("WAN"), wireless LAN, personal area network ("PAN"), or an Intranet, or a network of networks, such as the Internet. Any or all components of electronic system 600 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices specifically configured for the infusion features described can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, and any other optical or magnetic media. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a specifically configured computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented. Illustration of Subject Technology as Clauses:

Various examples of aspects of the disclosure are described as numbered clauses (1, 2, 3, etc.) for convenience. These are provided as examples, and do not limit the subject technology. Identifications of the figures and reference numbers are provided below merely as examples and for illustrative purposes, and the clauses are not limited by those identifications.

Clause 1. A locking cap assembly, the locking cap assembly includes an upper housing; a lower housing rotatably connected to the upper housing and configured to be fitted onto a container; a near field communication (NFC) module configured to wirelessly receive a NFC input; an inductive charging coil; a microprocessor; and a latching mechanism, the latching mechanism includes: a locking latch configured to prevent the upper housing and the lower housing from rotating with respect to each other; and an electrical actuation component configured to lock and unlock the latch responsive to a signal received from the microprocessor and a current generated by the inductive charging coil. The lower housing includes a plurality of locking vanes within the lower housing, the locking vanes being configured to variably define an inner diameter size of the lower housing responsive to a rotation of the upper housing with respect to the lower housing when the lower housing is mechanically engaged with the container. When the locking cap assembly is configured to lock onto the container by contracting the plurality of vanes about the container responsive to a rotation of the upper housing with respect to the lower housing in a first direction, and the microprocessor is configured to receive the NFC input from the NFC module and to unlock the locking latch and permit the rotation of upper housing with respect to the lower housing in a second direction to retract the plurality of locking vanes and release the lower housing from the container responsive to the microprocessor determining that the NFC input received by the NFC module corresponds to an authorization to release the locking cap assembly from the container.

Clause 2. The locking cap assembly of Clause 2, further including a vane positioning ring within the lower housing, the vane positioning ring being coupled to the plurality of locking vanes and to the upper housing, wherein the vane positing ring extends or retracts the plurality of locking vanes when the vane positioning ring is rotated, together with the upper housing, relative to the lower housing.

Clause 3. The locking cap assembly of Clause 2, further including a plurality of locking slots positioned within the lower housing, wherein the locking latch is configured to engage one of the plurality of locking slots from the upper housing.

Clause 4. The locking cap assembly of Clause 2, further including a display disposed in the upper housing, the display is configured to present a unique identifier associated with a medication in the container and a recipient of the medication.

Clause 5. The locking cap assembly of Clause 4, wherein the locking cap assembly is configured to transmit the unique identifier to a device proximate to the locking cap assembly, and receive the authorization, via the NFC module, from the device proximate to the locking cap assembly after the unique identifier is transmitted to and read by the device.

Clause 6. The locking cap assembly of Clause 5, further including electrical components to receive wireless power charging from the device to power an electrical actuation component of the locking cap assembly.

Clause 7. The locking cap assembly of Clause 2, wherein the lower housing is positioned between the upper housing and the container.

Clause 8. The locking cap assembly of Clause 7, wherein the electrical actuation component is coupled to the vane positioning ring and configured to cause a motor-driven rotation of the upper housing with respect to the lower housing to lock or unlock the locking cap assembly onto the container responsive to the signal received from the microprocessor.

Clause 9. The locking cap assembly of any one of Clauses 1 through 8, further including an optical sensor configured to determine a position of the locking latch for determining a locking state of the locking cap assembly.

Clause 10. The locking cap assembly of any one of Clauses 1 through 9, further including a buzzer configured to emit a human perceivable output at a predetermined time prior to a scheduled administration of a medication in the container.

Clause 11. The locking cap assembly of Clause 10, wherein the human perceivable output is at least one of a sound or a vibration.

Clause 12. The locking cap assembly of any one of Clauses 1 through 10, wherein the NFC module is configured to communicate information to a data network responsive to a determination that the locking cap assembly is unlocked from the container.

Clause 13. A method of securing a medication container, the method including receiving, by a near field communication (NFC) module in a locking cap assembly, an authorization code sent wirelessly from a device placed in proximity to the locking cap assembly via a communication channel of the NFC module; in accordance with a determination that the authorization code is a valid authorization code, determining if a current time is within a medication administration time interval; in accordance with a determination that the current time is within the medication administration time interval: releasing a locking latch of the locking cap assembly to permit a plurality of locking vanes of the locking cap assembly to retract when an input received by the NFC module corresponds to an authorization to release the locking cap assembly from the medication container, wherein the plurality of locking vanes variably defines a size of a central opening, and the plurality of locking vanes is configured to be mechanically engaged with the medication container in a locked state of the locking cap assembly, and wherein electrical power for releasing the locking latch is provided by a wireless energy transfer from the device via the communication channel to a motor of the locking cap assembly.

Clause 14. The method of Clause 13, further including receiving the authorization code sent by a device after the device reads, using an NFC module of the device, a unique identifier associated with the locking cap assembly.

Clause 15. The method of Clause 13 or 14, further including storing, in a data network, authorization information for unlocking the medication container so that the medication container is configured to be unlocked by a plurality of authorized mobile terminals that retrieves the authorization information over the data network.

Clause 16. The method of any one of Clauses 13 through 15, wherein the device comprises a cell phone, and the valid authorization code is transmitted as a cryptographic hash code from the cell phone to the locking cap assembly, and the locking cap assembly includes a decryption key for decrypting the valid authorization code.

Clause 17. The method of any one of Clauses 13 through 16, further including: sending, via the NFC module of the locking cap assembly, data to a data network after the medication container has been unlocked; and maintaining, at the data network, a record of when medication in the medication container is administered.

Clause 18. The method of any one of Clauses 13 through 17, further including: sounding an alarm in the locking cap assembly at a predetermined time prior to a scheduled subsequent administration of medication in the medication container.

Clause 19. The method of any one of Clauses 13 through 18, further including updating a display on the locking cap assembly after the medication container has been unlocked to provide dosage or other information relating to medication in the medication container.

Clause 20. The method of any one of Clauses 13 through 19, further including transferring an access code for releasing the locking cap assembly from a first authorized mobile device to a second authorized mobile device.

Further Consideration:

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean “one and only one” unless specifically so stated, but rather “one or more.” Unless specifically stated otherwise, the term “some” refers to one or more. Pronouns in the masculine (e.g., his) include the feminine and neuter gender (e.g., her and its) and vice versa. Headings and subheadings, if any, are used for convenience only and do not limit the invention described herein.

The term website, as used herein, may include any aspect of a website, including one or more web pages, one or more servers used to host or store web related content, etc. Accordingly, the term website may be used interchangeably with the terms web page and server. The predicate words “configured to”, “operable to”, and “programmed to” do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word “example” is used herein to mean “serving as an example or illustration.” Any aspect or design described herein as “example” is not necessarily to be construed as preferred or advantageous over other aspects or designs.

A phrase such as an “aspect” does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an “embodiment” does not imply that such embodiment is essential to the subject technology or that such embodiment applies to all configurations of the subject technology. A disclosure relating to an embodiment may apply to all implementations, or one or more implementations. An embodiment may provide one or more examples. A phrase such as an “embodiment” may refer to one or more embodiments and vice versa. A phrase such as a “configuration” does not imply that such configuration is essential to the subject technology or that such configuration applies to all configurations of the subject technology. A disclosure relating to a configuration may apply to all configurations, or one or more configurations. A configuration may provide one or more examples. A phrase such as a “configuration” may refer to one or more configurations and vice versa.

As used herein, the terms “determine” or “determining” encompass a wide variety of actions. For example, “determining” may include calculating, computing, processing, deriving, generating, obtaining, looking up (e.g., looking up in a table, a database or another data structure), ascertaining and the like via a hardware element without user intervention. Also, “determining” may include receiving (e.g., receiving information), accessing (e.g., accessing data in a memory) and the like via a hardware element without user intervention. “Determining” may include resolving, selecting, choosing, establishing, and the like via a hardware element without user intervention.

As used herein, the terms “provide” or “providing” encompass a wide variety of actions. For example, “providing” may include storing a value in a location of a storage device for subsequent retrieval, transmitting a value directly to the recipient via at least one wired or wireless communication medium, transmitting or storing a reference to a value, and the like. “Providing” may also include encoding, decoding, encrypting, decrypting, validating, verifying, and the like via a hardware element.

As used herein, the term “message” encompasses a wide variety of formats for communicating (e.g., transmitting or receiving) information. A message may include a machine readable aggregation of information such as an XML document, fixed field message, comma separated message, JSON, a custom protocol, or the like. A message may, in some embodiments, include a signal utilized to transmit one or more representations of the information. While recited in the singular, it will be understood that a message may be composed, transmitted, stored, received, etc. in multiple parts.

As used herein, the terms “correspond” or “corresponding” encompasses a structural, functional, quantitative and/or qualitative correlation or relationship between two or more objects, data sets, information and/or the like, preferably where the correspondence or relationship may be used to translate one or more of the two or more objects, data sets, information and/or the like so to appear to be the same or equal. Correspondence may be assessed using one or more of a threshold, a value range, fuzzy logic, pattern matching, a machine learning assessment model, or combinations thereof.

In any embodiment, data generated or detected can be forwarded to a “remote” device or location, where “remote,” means a location or device other than the location or device at which the program is executed. For example, a remote location could be another location (e.g., office, lab, etc.) in the same city, another location in a different city, another location in a different state, another location in a different country, etc. As such, when one item is indicated as being “remote” from another, what is meant is that the two items can be in the same room but separated, or at least in different rooms or different buildings, and can be at least one mile, ten miles, or at least one hundred miles apart. “Communicating” information references transmitting the data representing that information as electrical signals over a suitable communication channel (e.g., a private or public network). “Forwarding” an item refers to any means of getting that item from one location to the next, whether by physically transporting that item or otherwise (where that is possible) and includes, at least in the case of data, physically transporting a medium carrying the data or communicating the data. Examples of communicating media include radio or infra-red transmission channels as well as a network connection to another computer or networked device, and the internet or cellular networks.

As used herein a “user interface” (also referred to as an interactive user interface, a graphical user interface or a UI) may refer to a network based interface including data fields and/or other control elements for receiving input signals or providing electronic information and/or for providing information to the user in response to any received input signals. Control elements may include dials, buttons, icons, selectable areas, or other perceivable indicia presented via the UI that, when interacted with (e.g., clicked, touched, selected, etc.), initiates an exchange of data for the device presenting the UI. A UI may be implemented in whole or in part using technologies such as hyper-text mark-up language (HTML), FLASH™, JAVA™, .NET™, web services, or rich site summary (RSS). In some implementations, a UI may be included in a stand-alone client (for example, thick client, fat client) configured to communicate (e.g., send or receive data) in accordance with one or more of the aspects described. The communication may be to or from a medical device, diagnostic device, monitoring device, or server in communication therewith.

What is claimed is:

1. A locking cap assembly, the locking cap assembly comprising:

an upper housing;

a lower housing rotatably connected to the upper housing and configured to be fitted onto a container;

a near field communication (NFC) module configured to wirelessly receive a NFC input;

an inductive charging coil;

a microprocessor; and a latching mechanism, the latching mechanism includes:

a locking latch configured to prevent the upper housing and the lower housing from rotating with respect to each other; and an electrical actuation component configured to lock and unlock the latch responsive to a signal received from the microprocessor and a current generated by the inductive charging coil;

wherein the lower housing includes a plurality of locking vanes within the lower housing, the locking vanes being configured to variably define an inner diameter size of the lower housing responsive to a rotation of the upper housing with respect to the lower housing when the lower housing is mechanically engaged with the container, wherein when the locking cap assembly is configured to lock onto the container by contracting the plurality of vanes about the container responsive to a rotation of the upper housing with respect to the lower housing in a first direction, and wherein the microprocessor is configured to receive the NFC input from the NFC module and to unlock the locking latch and permit the rotation of upper housing with respect to the lower housing in a second direction to retract the plurality of locking vanes and release the lower housing from the container responsive to the microprocessor determining that the NFC input received by the NFC module corresponds to an authorization to release the locking cap assembly from the container.

2. The locking cap assembly of claim 1, further comprising:

a vane positioning ring within the lower housing, the vane positioning ring being coupled to the plurality of locking vanes and to the upper housing, wherein the vane positing ring extends or retracts the plurality of locking vanes when the vane positioning ring is rotated, together with the upper housing, relative to the lower housing.

3. The locking cap assembly of claim 1, further comprising an optical sensor configured to determine a position of the locking latch for determining a locking state of the locking cap assembly.

4. The locking cap assembly of claim 1, further comprising a buzzer configured to emit a human perceivable output at a predetermined time prior to a scheduled administration of a medication in the container.

5. The locking cap assembly of claim 4, wherein the human perceivable output is at least one of a sound or a vibration.

6. The locking cap assembly of claim 1, wherein the NFC module is configured to communicate information to a data network responsive to a determination that the locking cap assembly is unlocked from the container.

7. The locking cap assembly of claim 2, further comprising a plurality of locking slots positioned within the lower housing, wherein the locking latch is configured to engage one of the plurality of locking slots from the upper housing.

8. The locking cap assembly of claim 2, further comprising a display disposed in the upper housing, the display is configured to present a unique identifier associated with a medication in the container and a recipient of the medication.

9. The locking cap assembly of claim 2, wherein the lower housing is positioned between the upper housing and the container.

10. The locking cap assembly of claim 9, wherein the electrical actuation component is coupled to the vane positioning ring and configured to cause a motor-driven rotation of the upper housing with respect to the lower housing to lock or unlock the locking cap assembly onto the container responsive to the signal received from the microprocessor.

11. The locking cap assembly of claim 8, wherein the locking cap assembly is configured to transmit the unique identifier to a device proximate to the locking cap assembly, and receive the authorization, via the NFC module, from the device proximate to the locking cap assembly after the unique identifier is transmitted to and read by the device.

12. The locking cap assembly of claim 11, further comprising electrical components to receive wireless power charging from the device to power an electrical actuation component of the locking cap assembly.

13. A method of securing a medication container, the method comprising:

receiving, by a near field communication (NFC) module in a locking cap assembly, an authorization code sent wirelessly from a device placed in proximity to the locking cap assembly via a communication channel of the NFC module;

in accordance with a determination that the authorization code is a valid authorization code, determining if a current time is within a medication administration time interval;

in accordance with a determination that the current time is within the medication administration time interval:

releasing a locking latch of the locking cap assembly to permit a plurality of locking vanes of the locking cap assembly to retract when an input received by the NFC module corresponds to an authorization to release the locking cap assembly from the medication container, wherein the plurality of locking vanes variably defines a size of a central opening, and the plurality of locking vanes is configured to be mechanically engaged with the medication container in a locked state of the locking cap assembly, and wherein electrical power for releasing the locking latch is provided by a wireless energy transfer from the device via the communication channel to a motor of the locking cap assembly.

14. The method of claim 13, further comprising:

receiving the authorization code sent by a device after the device reads, using an NFC module of the device, a unique identifier associated with the locking cap assembly.

15. The method of claim 13, further comprising storing, in a data network, authorization information for unlocking the medication container so that the medication container is configured to be unlocked by a plurality of authorized mobile terminals that retrieves the authorization information over the data network.

16. The method of claim 13, wherein the device comprises a cell phone, and the valid authorization code is transmitted as a cryptographic hash code from the cell phone to the locking cap assembly, and the locking cap assembly includes a decryption key for decrypting the valid authorization code.

17. The method of claim 13, further comprising:

sending, via the NFC module of the locking cap assembly, data to a data network after the medication container has been unlocked; and maintaining, at the data network, a record of when medication in the medication container is administered.

18. The method of claim 13, further comprising: sounding an alarm in the locking cap assembly at a predetermined time prior to a scheduled subsequent administration of medication in the medication container.

19. The method of claim 13, further comprising updating a display on the locking cap assembly after the medication container has been unlocked to provide dosage or other information relating to medication in the medication container.

20. The method of claim 13, further comprising transferring an access code for releasing the locking cap assembly from a first authorized mobile device to a second authorized mobile device.

* * * * *